United States Patent
Koda et al.

(10) Patent No.: US 10,944,735 B2
(45) Date of Patent: Mar. 9, 2021

(54) AUTHENTICATION DEVICE, SERVER COMPUTER, AUTHENTICATION METHOD, MOBILE TERMINAL WITH CAMERA, AND CODE LABEL

(71) Applicant: TOPPAN PRINTING CO., LTD., Tokyo (JP)

(72) Inventors: Soko Koda, Tokyo (JP); Akihito Kagotani, Tokyo (JP)

(73) Assignee: TOPPAN PRINTING CO., LTD., Tokyo (JP)

(*) Notice: Subject to any disclaimer, the term of this patent is extended or adjusted under 35 U.S.C. 154(b) by 0 days.

(21) Appl. No.: 16/862,852

(22) Filed: Apr. 30, 2020

(65) Prior Publication Data
US 2020/0259813 A1   Aug. 13, 2020

Related U.S. Application Data

(63) Continuation of application No. PCT/JP2018/042290, filed on Nov. 15, 2018.

(30) Foreign Application Priority Data

Nov. 15, 2017   (JP) .............................. JP2017-220014

(51) Int. Cl.
*H04L 29/06*   (2006.01)
*G06K 1/12*   (2006.01)
(Continued)

(52) U.S. Cl.
CPC .............. *H04L 63/08* (2013.01); *G06K 1/121* (2013.01); *G06K 7/10722* (2013.01);
(Continued)

(58) Field of Classification Search
CPC .......... G06Q 20/3274; G06Q 20/3276; H04W 12/00522
See application file for complete search history.

(56) References Cited

U.S. PATENT DOCUMENTS

| 8,336,761 B1* | 12/2012 | McCloskey | .......... | G07G 1/0054 |
| | | | | 235/375 |
| 2006/0022059 A1* | 2/2006 | Juds | ..................... | G06K 7/1434 |
| | | | | 235/494 |

(Continued)

FOREIGN PATENT DOCUMENTS

| JP | S62-283385 A | 12/1987 |
| JP | H04-340689 A | 11/1992 |

(Continued)

OTHER PUBLICATIONS

Divya et al., "Security with Holographic Barcodes Using Computer Generated Holograms", pp. 162-166 (Year: 2013).*

(Continued)

*Primary Examiner* — Thaddeus J Plecha
(74) *Attorney, Agent, or Firm* — Foley & Lardner LLP

(57) ABSTRACT

An authentication apparatus including an input interface to acquires an image of a hologram label on an access object including key information; a processing history storage table that correlates a first image with the key information and stores the correlated image; an information determination circuit that refers to the processing history storage table, based on key information included in a second image that is being acquired after the first image, and determines whether the key information corresponds to key information of the second image; and a processing determination circuit that compares feature data of the second image that is not key information with feature data of the first image that is not key information in response to the information determination circuit determining the key information of the first image as being present, and uses the results of the comparison to determine whether to execute processing using the second image.

16 Claims, 14 Drawing Sheets

(51) Int. Cl.
*G06K 7/10* (2006.01)
*G06K 7/14* (2006.01)
*G06K 9/00* (2006.01)
*H04M 1/02* (2006.01)
*H04M 1/725* (2021.01)
*H04W 12/06* (2021.01)
*G06Q 20/32* (2012.01)
*H04W 12/00* (2021.01)
*G03H 1/04* (2006.01)

(52) U.S. Cl.
CPC ....... *G06K 7/1413* (2013.01); *G06K 9/00577* (2013.01); *G06Q 20/3274* (2013.01); *G06Q 20/3276* (2013.01); *H04M 1/0264* (2013.01); *H04M 1/72561* (2013.01); *H04W 12/00522* (2019.01); *H04W 12/06* (2013.01); *G03H 1/04* (2013.01); *G06K 2009/0059* (2013.01)

(56) References Cited

U.S. PATENT DOCUMENTS

| | | | | |
|---|---|---|---|---|
| 2008/0116256 | A1* | 5/2008 | Martin | G07B 17/00508 235/375 |
| 2012/0027297 | A1* | 2/2012 | Feris | G06T 7/11 382/173 |
| 2015/0227946 | A1* | 8/2015 | Huang | G06Q 30/0185 235/462.25 |
| 2016/0267369 | A1* | 9/2016 | Picard | G06K 7/1434 |
| 2017/0140144 | A1* | 5/2017 | Bock | G06Q 20/3276 |
| 2018/0144160 | A1* | 5/2018 | Shirakura | G03H 1/0005 |

FOREIGN PATENT DOCUMENTS

| | | |
|---|---|---|
| JP | 2003-046832 A | 2/2003 |
| JP | 2012-151789 A | 8/2012 |
| JP | 2015-084200 A | 4/2015 |
| JP | 2015-099515 A | 5/2015 |

OTHER PUBLICATIONS

International Searching Authority, "International Search Report," issued in connection with International Patent Application No. PCT/JP2018/042290, dated Feb. 12, 2019.

International Searching Authority, "Written Opinion," issued in connection with International Patent Application No. PCT/JP2018/042290, dated Feb. 12, 2019.

* cited by examiner

FIG.5

| TIME STAMP | USER INFORMATION | IMAGE DATA | KEY INFORMATION | PROCESSING DETERMINATION RESULTS 520 |
|---|---|---|---|---|
| ... | ... | ... | ... | AUTHENTICATED |
| ... | ... | ... | ... | NOT AUTHENTICATED |
| ... | ... | ... | ... | ... |

| TIME STAMP | USER INFORMATION | IMAGE DATA | KEY INFORMATION | PROCESS DETERMINATION RESULTS | PROCESS IDENTIFICATION INFORMATION |
|---|---|---|---|---|---|
| ... | ... | ... | ... | AUTHENTICATED | RENTED |
| ... | ... | ... | ... | NOT AUTHENTICATED | RENTED |
| ... | ... | ... | ... | ... | ... |

520D

AUTHENTICATION DEVICE, SERVER COMPUTER, AUTHENTICATION METHOD, MOBILE TERMINAL WITH CAMERA, AND CODE LABEL

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2018/042290, filed on Nov. 15, 2018, which is based upon and claims the benefit of priority to Japanese Patent Application No. 2017-220014, filed on Nov. 15, 2017, the disclosures of which are all incorporated herein by reference in their entireties.

TECHNICAL FIELD

The present invention provides embodiments relating to an authentication device, a server computer, an authentication method, a mobile terminal with a camera, and a code label.

BACKGROUND ART

For managing access objects, identification information such as barcodes have been printed and respectively affixed to access objects. If a user desires processing of an access object by a system, the user may capture an image of the barcode or the like affixed to the access object and request the desired processing by transmitting the image to a server computer on the system for the server computer to execute the desired processing.

For example, PTL 1 discloses a system for a stamp rally which uses camera functions of a smartphone. In this system, a user can capture an image of a barcode or the like printed on a specific poster, as an access object, posted at a specified site and transmit the captured image to a server computer, so that the user is proven to have visited the site.

CITATION LIST

Patent Literature

[PTL 1] JP 2003-46832 A

SUMMARY OF THE INVENTION

Technical Problem

However, in the event that the image of the barcode is distributed to a second user, the second user can request processing for the access object by the system and get the system to execute desired processing, although the second user has not directly captured the image of the barcode as an access object. This may develop a situation unfavorable for managing access objects.

The present invention has been made in light of the foregoing issues and aims to provide an authentication device, a server computer, an authentication method, a mobile terminal with a camera, and a code label which are capable of preventing or minimizing reuse of an image in the access control using an access object.

Solution to Problem

As solutions, the embodiments of the present invention have aspects as set forth below.

The aspects can be combined with each other so that the effects of the combinations can be synergistically exerted.

The aspects of the embodiments can also be combined with features thereof so that the effects of the combinations can be synergistically exerted.

The features of the embodiments can be combined with each other so that the effects of the combinations can be synergistically exerted.

To ameliorate or even solve the foregoing issues, one aspect of the present invention is an authentication device that includes: an input interface that acquires an image of a hologram label that is affixed to an access object and includes an image indicating key information; a processing history storage table that correlates a first image acquired by the input interface with key information included in the first image and stores the correlated image; an information determination circuit that refers to the processing history storage table, based on key information included in a second image, the second image being acquired by the input interface after acquisition of the first image, and determines whether key information of the first image exists that corresponds to key information of the second image; and a processing determination circuit that compares feature data of the second image that is not key information with feature data of the first image that is not key information in response to the information determination circuit determining the key information of the first image as being present, and uses the results of the comparison as a basis for determining whether to execute processing using the second image.

In one aspect of the present invention, the input interface may acquire an image including a predetermined pattern and the hologram label, the predetermined pattern being provided to the access object; and the processing determination circuit may determine whether to execute the processing using the second image, based on the results of comparing relative positions of the predetermined pattern and the hologram label in the second image, with relative positions of the predetermined pattern and the hologram label in the first image.

In one aspect of the present invention, the key information may be site information indicating a site where the access object with the hologram label is located.

In one aspect of the present invention, the device may further include a display that is provided near the hologram label to receive and present thereon site information indicating the position of the hologram label; the input interface may acquire an image including site information and the hologram label, the site information being shown on the display; and in response to the site information included in the image not matching predetermined site information, the processing determination circuit may determine not to execute processing using the image.

In one aspect of the present invention, when acquiring the image, the input interface may acquire position information indicating the position of a terminal device from the terminal device which is a transmission source of the image; the information determination circuit may determine whether the site information indicated by the key information of the hologram label matches the position information acquired by the input interface; and in response to the site information being determined not to match the position information, the processing determination circuit may determine not to execute processing using the image.

In one aspect of the present invention, the processing history storage table may store current status information so as to correlate with the first image, the current status information indicating processing performed based on the first image; and in response to the second image having been received, the processing determination circuit may determine to execute processing using the image when a processing request transmitted from a terminal device as a transmission source of the second image does not match a processing content indicated by the current status information of the first image.

In one aspect of the present invention, the processing history storage table may correlate current status information, which indicates processing performed based on the first image, with the first image and store the correlated image; and in response to the second image having been received, the processing determination circuit may determine not to execute processing using the image when a processing request transmitted from a terminal device as a transmission source of the second image matches a processing content indicated by the current status information of the first image.

To ameliorate or even solve the foregoing issues, one aspect of the present invention is an authentication method performed by an authentication device that includes a processing history storage table, the authentication method including: an acquisition step of acquiring an image of a hologram label that is affixed to an access object and includes an image indicating key information; a storage step of correlating a first image acquired by an input interface with key information included in the first image and storing the correlated image in a processing history storage table; an information determination step, performed by an information determination circuit, of referring to the processing history storage table, based on key information included in a second image, the second image being acquired by the input interface after acquisition of the first image, and determining whether key information of the first image exists that corresponds to key information of the second image; and a processing determination step, performed by a processing determination circuit, of comparing feature data of the second image that is not key information with feature data of the first image that is not key information in response to the information determination circuit determining the key information of the first image as being present, and using the results of the comparison as a basis for determining whether to execute processing using the second image.

To ameliorate or even solve the foregoing issues, one aspect of the present invention is a server computer including: an input interface that acquires an image of a hologram label that is affixed to an access object and includes an image indicating key information; a processing history storage table that correlates a first image acquired by the input interface with key information included in the first image and stores the correlated image; an information determination circuit that refers to the processing history storage table, based on key information included in a second image, the second image being acquired by the input interface after acquisition of the first image, and determines whether key information of the first image exists that corresponds to key information of the second image; and a processing determination circuit that compares feature data of the second image that is not key information with feature data of the first image that is not key information in response to the information determination circuit determining the key information of the first image as being present, and uses the results of the comparison as a basis for determining whether to execute processing using the second image.

In one aspect of the present invention, the input interface may acquire an image including a predetermined pattern and the hologram label, the predetermined pattern being provided to the access object; and the processing determination circuit may determine whether to execute the processing using the second image, based on the results of comparing relative positions of the predetermined pattern and the hologram label in the second image, with relative positions of the predetermined pattern and the hologram label in the first image.

In one aspect of the present invention, the key information may be site information indicating a site where the access object with the hologram label is located.

In one aspect of the present invention, the input interface acquires an image including site information and the hologram label, the site information indicating a position of the hologram label and presented on a display, the display being provided near the hologram label to receive and present the site information thereon; and in response to the site information included in the image not matching predetermined site information, the processing determination circuit may determine not to execute processing using the image.

In one aspect of the present invention, when acquiring the image, the input interface may acquire position information indicating the position of a terminal device from the terminal device which is a transmission source of the image; the information determination circuit may determine whether the site information indicated by the key information of the hologram label matches the position information acquired by the input interface; and in response to the site information being determined not to match the position information, the processing determination circuit may determine not to execute processing using the image.

In one aspect of the present invention, the processing history storage table may store current status information so as to correlate with the first image, the current status information indicating processing performed based on the first image; and in response to the second image having been received, the processing determination circuit may determine to execute processing using the image when a processing request transmitted from a terminal device as a transmission source of the second image does not match a processing content indicated by the current status information of the first image.

In one aspect of the present invention, the processing history storage table may correlate current status information, which indicates processing performed based on the first image, with the first image and store the correlated image; and in response to the second image having been received, the processing determination circuit may determine not to execute processing using the image when a processing request transmitted from a terminal device as a transmission source of the second image matches a processing content indicated by the current status information of the first image.

To ameliorate or even solve the foregoing issues, one aspect of the present invention is an authentication method performed by a server computer that includes a processing history storage table, the authentication method including: an acquisition step, performed by an input interface, of acquiring an image of a hologram label that is affixed to an access object and includes an image indicating key information; a storage step of correlating a first image acquired by the input interface with key information included in the first image and storing the correlated image in a processing history storage table; an information determination step, performed by an information determination circuit, of referring to the processing history storage table, based on key information included in a second image, the second image being acquired by the input interface after acquisition of the first image, and determining whether key information of the first image exists that corresponds to key information of the second image; and a processing determination step, performed by a processing determination circuit, of comparing feature data of the second image that is not key information with feature data of the first image that is not key information in response the information determination circuit determining the key information of the first image as being present, and using the results of the comparison as a basis for determining whether to execute processing using the second image.

To ameliorate or even solve the foregoing issues, one aspect of the present invention is a mobile terminal with a camera configured to: acquire an image of a hologram that is affixed to an access object and includes an image indicating key information; communicate with a server computer; correlate a first image acquired by an input interface with key information included in the first image and transmit the correlated image to a processing history storage table of the server computer, for storage therein; allow an information determination circuit of the server computer to refer to the processing history storage table, based on key information included in a second image acquired by the input interface after acquisition of the first image, and to determine whether key information of the first image exists that corresponds to key information of the second image; and allow a processing determination circuit to compare feature data of the second image that is not key information with feature data of the first image that is not information in response to the information determination circuit determining the key information of the first image as being present, and to use the results of the comparison as a basis for acquiring results of executing processing based on the second image or results of rejecting processing based on the second image.

To ameliorate or even solve the foregoing issues, one aspect of the present invention is a code label arranged in a flat region of an object and has a hologram code and a printed code around the hologram code. The hologram code and the printed code are adjacent to each other or partially overlap with each other. The hologram code has a plurality of reconstruction points. The hologram code is recorded as positions of the reconstruction points of the hologram. In the printed code, dots corresponding to bits of data in the printed code are recorded as color differences in a two-dimensional array.

Advantageous Effects of the Invention

According to the aspects of the present invention, an image, which has been used in an access control using an access object, can be better prevented from being used again in the access control.

BRIEF DESCRIPTION OF THE DRAWINGS

FIG. 5 is a diagram illustrating a configuration of a processing history storage table 520, according to the first embodiment.

DETAILED DESCRIPTION

Figure 1:
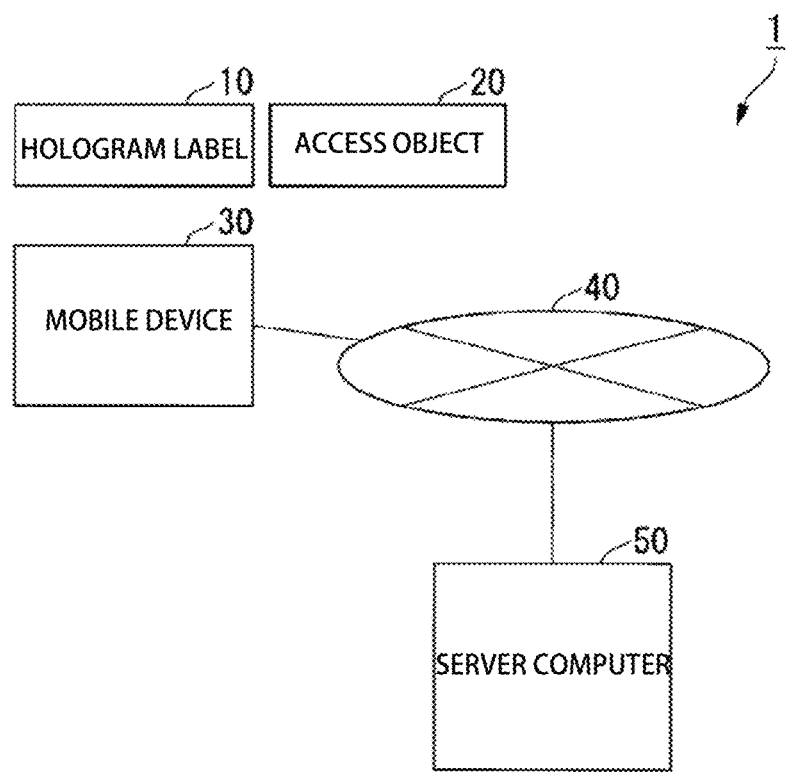
FIG. 1 is a configuration diagram illustrating an authentication device 1 according to a first embodiment.

With reference to the accompanying Figures, a description will now be given of representative embodiments according to the present invention. The present invention is not limited to the following representative embodiments, and appropriate modifications can be made without departing from the spirit of the present invention. The representative embodiments described below are merely examples of the present invention, and the design thereof could be appropriately changed by one skilled in the art. Here, the drawings are schematic, and the relationship between thickness and plane size, the ratio of the thickness of each layer, etc., may be different from actual ones. The embodiments described below are merely examples of the configurations for embodying the technical idea of the present invention, and the technical idea of the present invention should not limit the materials, shapes, structures, and the like of the components to those described below. The technical idea of the present invention can be modified in various ways within the technical scope specified by the claims.

The same constituent elements are denoted by the same reference numerals unless there is a reason for the sake of convenience, and redundant description is omitted. In the drawings referred to in the following description, for clarity, characteristic parts are enlarged, and thus the components are not shown to scale. It is, however, clear that one or more embodiments can be implemented without such details. In addition, known structures and devices may be schematically represented for simplicity.

Hereinafter, aspects of the present invention will be described with reference to the drawings. With reference to the drawings, an authentication device, a server computer, and an authentication method according to embodiments will be described.

In the embodiments of the present invention, an image of a hologram in a hologram label affixed to an access object can be acquired by a mobile device with a camera, and benefits and privileges related to the access object can be granted to the account of the user of the mobile device with a camera.

The benefits and privileges may also be granted by acquiring the images of hologram labels affixed to a plurality of access objects. The benefits may be related to specific brands, stores, commercial products, or the like, for use as points, discounts or the like. The privileges may be renting goods, or presenting virtual items or characters, or the like. In the following, a stamp rally will be described as Mode 1 of an embodiment of granting benefits. Renting goods will be described as Mode 2 of an embodiment of granting privileges. The embodiments of the present invention are not limited to a stamp rally or renting goods, as long as benefits and privileges can be granted.

First Embodiment

A first embodiment will be described. An authentication device 1 (authentication device) according to the present embodiment authenticates a hologram label and executes processing. In the present embodiment, the authentication device 1 may be a device that authenticates a hologram label affixed to an access object so that the user can acquire a stamp in a stamp rally and a benefit can be granted to the account of the user. The following description will be provided, taking an example in which the authentication device 1 serves as a device that authenticates acquisition of a stamp in a stamp rally.

FIG. 1 is a configuration diagram illustrating the authentication device 1 according to the first embodiment. The authentication device 1 may include a hologram label 10, an access object 20, a mobile device 30, and a server computer 50.

The hologram label 10 can express a three-dimensional image, a special decorative image or special color changes, or the like due to light interference. The hologram label 10 presents different images depending on the angle of viewing the hologram label 10.

The hologram label 10 is an image including key information. The key information here refers to information for determining whether to execute processing requested by the user, i.e., information for determining whether to authenticate the request from the user in the authentication device 1. The key information may indicate an identification number of the access object 20 to which the hologram label 10 is affixed, a site where the access object 20 is located, or the like.

Figure 2:
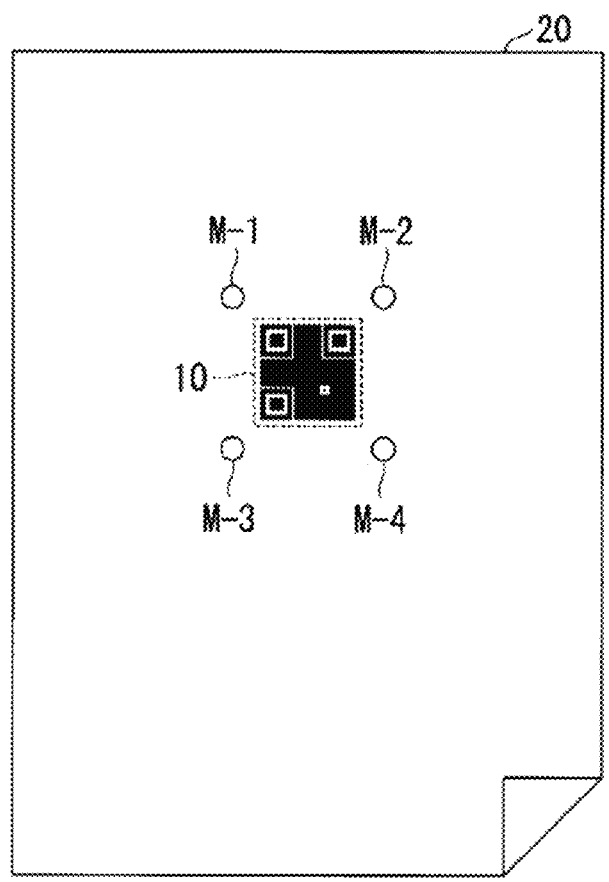
FIG. 2 is a diagram illustrating a hologram label 10 and an access object 20, according to the first embodiment.

The hologram label 10 may be a QR code (trademark) image in which key information is embedded (see FIG. 2). The hologram label 10 is not limited to a QR code image as long as it includes key information. The hologram label 10 may be a barcode in which key information is embedded or may be any optional image corresponding to key information.

The access object 20 may be printed matter. The printed matter may be a poster, signboard, advertisement, board, or the like. These poster, signboard, advertisement, and board may be provided to the course of the stamp rally to which the authentication device 1 is applied. The hologram label 10 is affixed to the access object 20.

The access object 20 may be located at a specific site. The specific site may be a store, a landmark, or a place of interest. By locating access objects 20 at such specific sites, customers can be guided to these specific sites. The access object 20 may be a building. The access object 20 may be a natural object. The access object 20 may be a monument.

The mobile device 30 may be a mobile terminal, smartphone, tablet, or the like. The mobile terminal may be a mobile terminal with a camera. The mobile device 30 communicates with the server computer 50 via a communication network 40.

A user carrying a mobile terminal with a camera can obtain access to the front of the access object 20 and easily capture an image of the access object 20.

The mobile device 30 may be a computer in which a stamp rally application (termed dedicated application hereinafter) is installed. Each participant of the stamp rally can capture an image of the hologram label 10 affixed to a poster or the like at a specified site of the stamp rally by using the mobile device 30 in which the dedicated application is activated. Then, the user who has transmitted the captured image to the server computer 50 via the dedicated application can acquire a stamp. In other words, the user who has transmitted the captured image to the server computer 50 via the dedicated application is granted a benefit.

The communication network 40 is an information transmission path. The communication network 40 may be a wireless communication transmission path, or may be a wired communication transmission path, or may be a combination of wireless and wired communication transmission paths.

The server computer 50 offers a service for a stamp rally provided by the dedicated application, based on data received from the mobile device 30.

The server computer 50 communicates with the mobile device 30 via the communication network 40. The server computer 50 receives an image of the hologram label 10 from the mobile device 30, and determines whether to execute processing of allowing the user to acquire a stamp, based on the received image. The processing of allowing the user to acquire a stamp based on the image is an example of the "image-based processing". In particular, the processing of allowing the user to acquire a stamp based on the image is an example of the "image-based processing of granting a benefit to the user".

The communication with the mobile device 30 is performed via the communication network 40.

The server computer 50 first determines whether the received image is an image corresponding to the stamp rally. If the image is an image corresponding to the stamp rally, the server computer 50 executes the processing of allowing the user to acquire a stamp.

If the received image corresponds to the stamp rally, the server computer 50 also determines whether the image is the same as another image already used for stamp acquisition by another user. If the received image is determined not to be a reused image, the server computer 50 executes processing for allowing the user to acquire a stamp.

The server computer 50 transmits the determination results as to whether to execute the processing to the mobile device 30.

FIG. 1 shows the case where one server computer 50 and one mobile device 30 are communicably connected. Alternatively, a plurality of mobile devices 30 may be communicably connected to one server computer 50, or a plurality of mobile devices 30 may be communicably connected to a plurality of server computers 50. Alternatively, one mobile device 30 may be communicably connected to a plurality of server computers 50.

FIG. 2 is a diagram illustrating the hologram label 10 and the access object 20 according to the first embodiment. In FIG. 2, the hologram label 10 is an image QR-1 in which a QR code is recorded. In FIG. 2, the access object 20 is a poster or the like.

As shown in FIG. 2, the hologram label 10 is affixed to the access object 20 (poster). In FIG. 2, markers M (markers M-1 to M-4) are provided to the four corners of the image QR-1. The markers M can be augmented reality (AR) markers which indicate that the hologram label 10 is present in the region enclosed by the markers M. Thus, in the authentication device 1, the markers M may be arranged around the hologram label 10.

The markers M may be formed by printing a printing ink. The ink may be visible ink, invisible ink, or a combination of these types of ink. The visible ink may be color ink or optically variable ink. The visible ink can be detected by visible light. The visible ink can have a print density (OD value) in the range of 1 or more and 3 or less. With this range, printing can be detected by a generally used camera. The print density of the visible ink may be more preferred to be in the range of 2 or more and 2.5 or less. With this range, printing can be easily detected by a generally used camera.

The color ink may be translucent ink or opaque ink. The ink may be gravure ink, offset ink, inkjet ink, or flexo ink. Inkjet ink, which can be printed by ink jetting, is suitable for printing a specific piece of information. Opaque ink can conceal base printing and improve readability. The color ink represents an object color. The object color presents a constant color without depending on the observation angle or illumination angle. Thus, the opaque ink has high readability. The optically variable ink may be pearl ink, magnetic ink or the like. The optically variable ink presents color variation depending on the observation angle or the illumination angle and thus has high anti-counterfeiting properties.

The invisible ink may be fluorescent ink, infrared absorbing ink or the like. These types of invisible ink are not visible to the naked eye. Images with these types of ink are made visible by using a special light source and a special camera. Therefore, the presence of such invisible ink is less likely to be noted by counterfeiters.

By combining visible ink with invisible ink, readability and anti-counterfeiting properties of the markers M may both be satisfied. Visible ink may be mixed with invisible ink for use as mixed ink. Such mixed ink, when printed once, can form both of visible ink printing and invisible ink printing.

The markers M may provide specific information. In other words, the makers M may be an identification code. The specific information can be easily formed using inkjet ink or the like. The markers M may be identification codes, and the hologram label may be an authentication code. Thus, anti-counterfeiting properties and distinguishability can both be satisfied.

Figure 3:
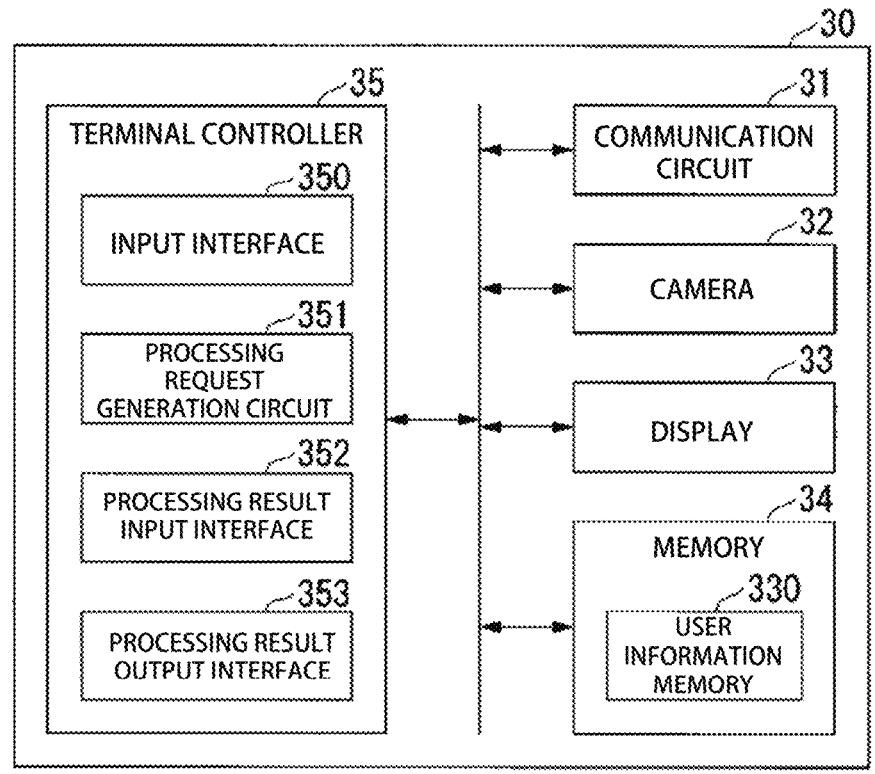
FIG. 3 is a block diagram illustrating a configuration of a mobile device 30, according to the first embodiment.

FIG. 3 is a block diagram illustrating a configuration of the mobile device 30 according to the first embodiment. The mobile device 30 may include a communication circuit 31, a camera 32, a display 33, a memory 34, and a terminal controller 35.

The communication circuit 31 may be a communication unit incorporated in the mobile device. The communication circuit 31 is connected to the communication network 40 to transmit data to the server computer 50 according to instructions received from the terminal controller 35. The communication circuit 31 receives data transmitted from the server computer 50 to the mobile device 30. The communication circuit 31 outputs the received data to the terminal controller 35.

The camera 32 may be incorporated in a mobile device. A mobile device incorporated with a camera may be a mobile terminal with a camera. A mobile terminal with a camera is a mobile terminal with a built-in camera. The camera 32 captures an image of the hologram label 10 according to an operation of the user or the like, and outputs data of the captured image to the terminal controller 35.

The display 33 may be incorporated into a mobile device. The display 33 can present contents transmitted from the server computer 50, according to instructions received from the terminal controller 35. The display 33 may be a touch panel or the like provided with an input function. The display 33 acquires information inputted by the user or the like operating the touch panel or the like. The display 33 outputs the acquired input information to the terminal controller 35.

The memory 34 stores various programs for operating the terminal controller 35, application programs such as dedicated applications, and various types of data. The memory 34 includes a user information memory 330. The user information memory 330 stores user information, such as a user ID in the stamp rally. The user information can serve as user identification information of a requester, when requesting acquisition of a stamp or the like to the server computer 50.

The terminal controller 35 includes an input interface 350, a processing request generation circuit 351, a processing result input interface 352, and a processing result output interface 353.

The input interface 350 acquires image data of an image captured by the camera 32. The input interface 350 outputs the acquired image data to the processing request generation circuit 351.

The input interface 350 acquires data that has been received by the communication circuit 31 from the server computer 50. The input interface 350 outputs the acquired data to the processing result output interface 353.

The processing request generation circuit 351 generates data to be transmitted to the server computer 50.

The processing request generation circuit 351 prepares data requesting acquisition of a stamp to the server computer 50. The processing request generation circuit 351 refers to the user information memory 330 and adds the user information to the image data derived from the input interface to thereby prepare data requesting acquisition of a stamp to the server computer 50. The processing request generation circuit 351 outputs the generated data to the communication circuit 31.

The processing result output interface 353 allows the display 33 to present the results received from the server computer 50. The results received from the server computer 50 refer to results in response to data received from the mobile device 30 requesting acquisition of a stamp, i.e., data indicating whether to authenticate acquisition of a stamp. The processing result output interface 353 acquires the data including the results received by the communication circuit 31, and outputs the acquired data to the display 33.

Figure 4:
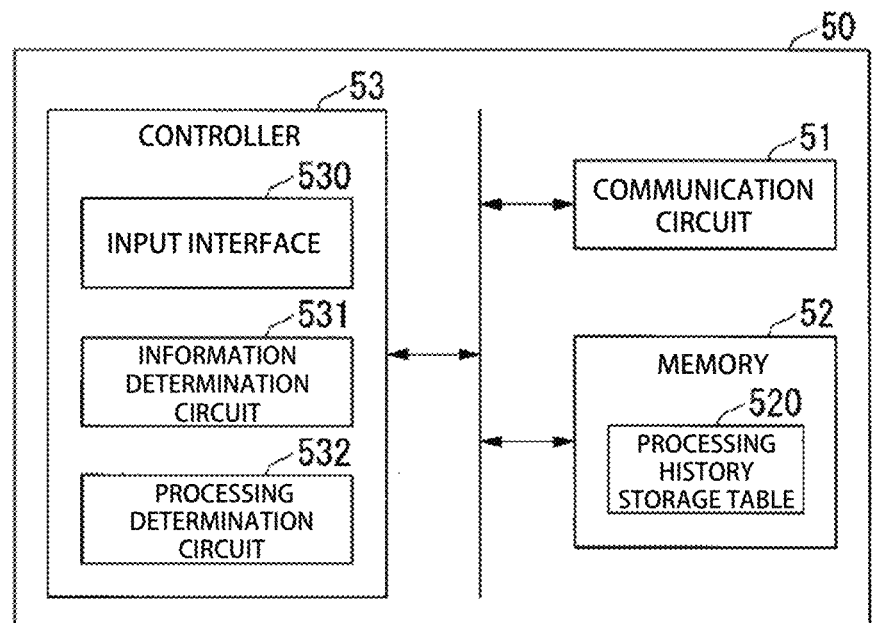
FIG. 4 is a block diagram illustrating a configuration of a server computer 50, according to the first embodiment.

FIG. 4 is a block diagram illustrating a configuration of the server computer 50 according to the first embodiment. The server computer 50 includes a communication circuit 51, a memory 52, and a controller 53.

The communication circuit 51 is connected to the communication network 40 to transmit data to the mobile device 30 according to an instruction from the controller 53. The communication circuit 51 receives data transmitted to the server computer 50 from the mobile device 30. The communication circuit 51 outputs the received data to the terminal controller 35.

The memory 52 stores various programs for operating the controller 53 and various types of data. The memory 52 stores a processing history storage table 520. The processing history storage table 520 stores a history of processing in response to the user's request such as for acquiring a stamp.

FIG. 5 is a diagram illustrating a configuration of the processing history storage table 520 according to the first embodiment. A processing history storage table 520 is prepared for each access object 20.

The processing history storage table 520 includes a time stamp, and items of user information, image data, key information, and processing determination results. In the processing history storage table 520, reception time of data from the mobile device 30 is stored in the time stamp. The user information stores user information included in the corresponding data, and the image data stores image data included in the corresponding data. The key information stores key information acquired by an information determination circuit 531, based on the image data included in the corresponding data. The current status information stores results of image matching included in the received data. The item of the processing determination results stores "authenticated" if the server computer 50 permits execution of image matching, and stores "rejected" if the server computer 50 does not permit execution of image matching.

Returning back to FIG. 4, the controller 53 includes an input interface 530, an information determination circuit 531, a processing determination circuit 532, and an output interface 533.

The input interface 530 acquires data that has been received by the communication circuit 51 from the mobile device 30. The input interface 530 outputs the acquired data to the information determination circuit 531.

The information determination circuit 531 acquires the data from the communication circuit 51, and determines whether key information is included in the image data which has been included in the acquired data. For example, if the image data is a QR code image, the information determination circuit 531 decodes the QR code and determines whether key information is included in the decoded information. If key information is included in the decoded information, the information determination circuit 531 determines that key information is included in the acquired image.

Alternatively, the information determination circuit 531 may refer to an information memory (not shown), in which images are correlated to key information, to determine whether an image corresponding to the acquired image data is stored in the information memory. If an image corresponding to the image data is stored in the information memory, the information determination circuit 531 determines that key information is included in the acquired image data.

When determining key information as being included in the image data, the information determination circuit 531 correlates the key information to the image data and outputs the correlated image to the processing determination circuit 532.

The processing determination circuit 532 determines whether to execute the processing requested by the user, based on the key information and the image data derived from the information determination circuit 531. The image which is determined by the information determination circuit 531 as including key information corresponds to the second image.

The processing determination circuit 532 refers to the processing history storage table 520 to determine whether there is stored an image including key information that is the same as the key information in the image acquired by the information determination circuit 531 (termed acquired image hereinafter).

If there is such a stored image in the processing history storage table 520, the processing determination circuit 532 extracts feature data included in both the acquired image and the stored image. It should be noted that feature data included in an image refers to data indicating features of the image, such as brightness and hue of the image, the position of the hologram label 10 relative to the imaged region, and other data. The feature data may also include imaging conditions estimated from the captured image. The feature data may also include position data of a reconstruction point group of the hologram. The reconstruction point hologram label 10 can present different images depending on the viewing angle. Therefore, every time an image is captured, the image changes according to the imaging angle and the intensity of light of a light source. Accordingly, there is only a very low probability that the images captured at different times are the same. Taking advantages of such characteristics of the hologram label 10, the processing determination circuit 532 extracts feature data from the images to confirm that the acquired image is not a reused image. Referring to FIGS. 6 and 7, a method of extracting feature data from images, as performed by the processing determination circuit 532, will be described.

Figure 6A:
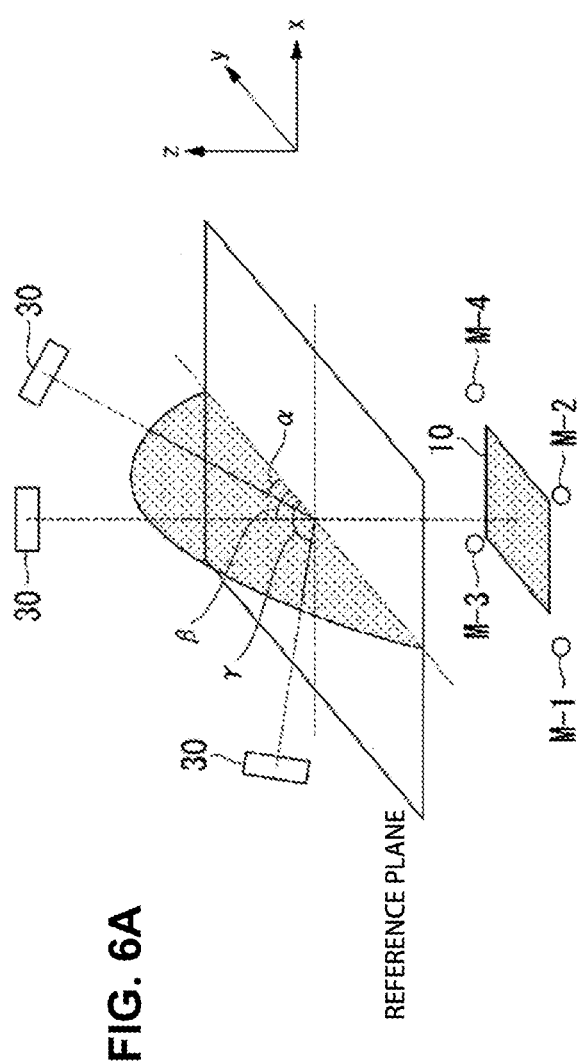
FIGS. 6A, 6B, 6C, and 6D are a set of diagrams illustrating a process of extracting feature data performed by the server computer 50, according to the first embodiment.
Figure 6B:
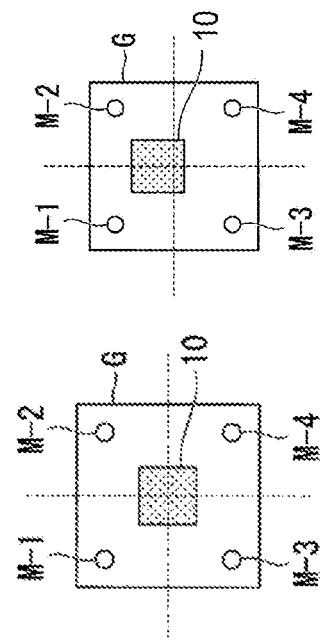
Figure 6C:
Figure 6D:
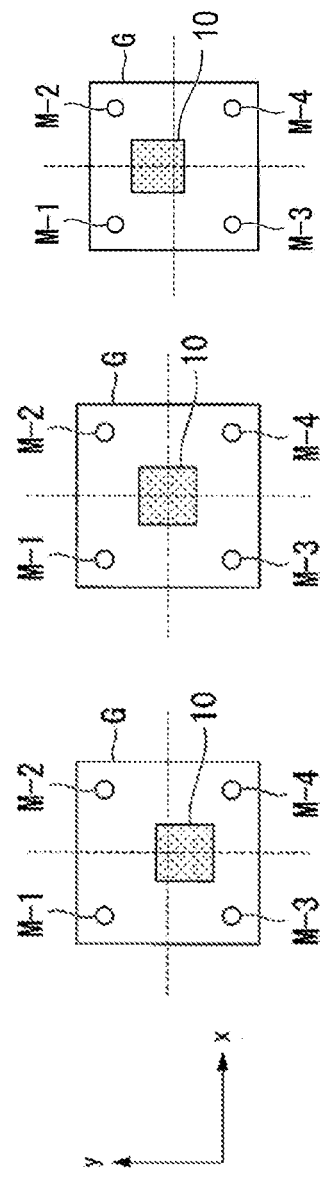
Figure 7:
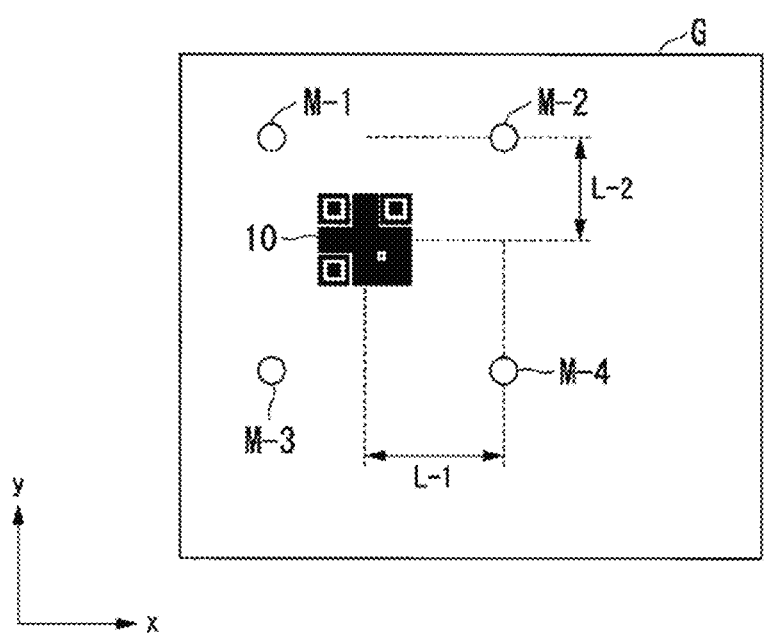
FIG. 7 is another diagram illustrating the process of extracting feature data performed by the server computer 50, according to the first embodiment.

FIGS. 6A, 6B, 6C, and 6D are a set of diagrams illustrating a process of extracting feature data performed by the server computer 50, according to the first embodiment. FIG. 6A is a schematic diagram illustrating the case where an image of the hologram label 10 is captured by the mobile device 30 at an angle $\alpha$, $\beta$ or $\gamma$ relative to a plane parallel to the display surface of the hologram label 10 (indicated as reference plane in FIGS. 6A, 6B, 6C, and 6D). FIG. 6B shows an image G captured at the angle α of FIG. 6A. FIG. 6C shows an image G captured at the angle β of FIG. 6A. FIG. 6D shows an image G captured at the angle γ of FIG. 6A. In FIG. 6A, markers M-1 to M-4 are symmetrical with respect to a barycenter of the hologram label 10. Specifically, the markers M-1 to M-4 are points on straight lines extending from the barycenter of the hologram label 10 toward the four respective corners of the hologram label 10. Distances from the barycenter of the hologram label 10 to the markers M-1 to M-4 are equal to each other.

As shown in FIG. 6A, the mobile device 30 may capture images of the hologram label 10 at various angles relative to the display surface of the hologram label 10. When the mobile device 30 captures an image of the hologram label 10 and the markers M at the angle α, the distances from the mobile device 30 to the markers M-3 and M-4 are smaller than the distances from the mobile device 30 to the markers M-1 and M-2. When the mobile device 30 captures an image of the hologram label 10 and the markers M at the angle (3, the distances from the mobile device 30 to the markers M-3 and M-4 are equal to the distances from the mobile device 30 to the markers M-1 and M-2. When the mobile device 30 captures an image of the hologram label 10 and the markers M at the angle γ, the distances from the mobile device 30 to the markers M-3 and M-4 are larger than the distances from the mobile device 30 to the markers M-1 and M-2.

As shown in FIG. 6B, when the mobile device 30 captures an image at the angle α, the captured image G includes the hologram label 10 positioned closer to the markers M-3 and M-4 than to the markers M-1 and M-2 in terms of a square enclosed by the markers M.

As shown in FIG. 6C, when the mobile device 30 captures an image at the angle (3, the captured image G includes the barycenter of the hologram label 10 aligned with the barycenter of the square enclosed by the markers M.

As shown in FIG. 6D, when the mobile device 30 captures an image at the angle γ, the captured image G includes the hologram label 10 positioned closer to the markers M-1 and M-2 than to the markers M-3 and M-4 in terms of the square enclosed by the markers M.

Taking advantages of the characteristics of the captured images being different depending on the imaging angle as mentioned above referring to FIGS. 6A, 6B, 6C, and 6D, the processing determination circuit 532 extracts feature data from the images.

FIG. 7 is a diagram illustrating the process of extracting feature data performed by the server computer 50 according to the first embodiment. FIG. 7 shows the image G including the hologram label 10 and the markers M (the markers M-1 to M-4).

For example, the processing determination circuit 532 calculates barycenter coordinates of the hologram label 10 and the markers M in the image G as feature data of the image G. Based on the calculated barycenter coordinates, the processing determination circuit 532 calculates a distance L-1 between an x coordinate of the barycenter coordinates of the hologram label 10 and an x coordinate of the barycenter coordinates of the marker M-2 (or the marker M-4) and calculates a distance L-2 between a y coordinate of the barycenter coordinates of the hologram label 10 and a y coordinate of the barycenter coordinates of the marker M-1 (or the marker M-2).

The processing determination circuit 532 calculates the distances L-1 and L-2 for each acquired image and each stored image. For example, if the difference in distance L-1 between acquired and stored images is less than a predetermined range, or if the difference in distance L-2 between acquired and stored images is less than a predetermined range, the processing determination circuit 532 determines that there is similarity in feature data between the two images.

Alternatively, for example, if the difference in distance L-1 between acquired and stored images is less than a predetermined range, and if the difference in distance L-2 between acquired and stored images is less than a predetermined range, the processing determination circuit 532 may determine that there is similarity in feature data between the two images.

Alternatively, the processing determination circuit 532 may detect close reconstruction points from the respective reconstruction point groups of the holograms of the acquired and stored images, and calculate a root mean square of the difference in distance between the detected reconstruction points and use the resultant value as a distance between the images. If the distance is within a predetermined range, the processing determination circuit 532 may determine that there is similarity. Alternatively, the processing determination circuit 532 may estimate an imaging position and an imaging direction for the hologram label from the markers M. If the distance between the imaging positions of the acquired and recorded images is within a predetermined range, the processing determination circuit 532 may determine that there is similarity. The distance between the imaging positions of the acquired and recorded images can be easily estimated from the markers.

Returning back to FIG. 4, the processing determination circuit 532 determines whether to execute processing based on the acquired image (e.g., processing authenticating the user's request for acquiring a stamp) based on the results of comparison between the feature data of the acquired image and that of the stored image. If it is determined that there is dissimilarity between the feature data of the acquired image and that of the stored image, the processing determination circuit 532 executes the processing based on the acquired image. If it is determined that there is similarity between the feature data of the acquired image and that of the stored image, the processing determination circuit 532 does not execute the processing based on the acquired image. This is because the acquired image is determined to be a reused image, i.e., reuse of an image that has already been used for executing the processing.

The processing determination circuit 532 correlates the user information included in the acquired data with the image data and the key information acquired from the image data, and stores the correlated image, together with the processing determination results, in the processing history storage table 520.

The processing determination circuit 532 outputs the determination results as to whether to execute the processing based on the acquired image to the communication circuit 51 and notifies the results to the mobile device 30 via the communication circuit 51.

Figure 8:
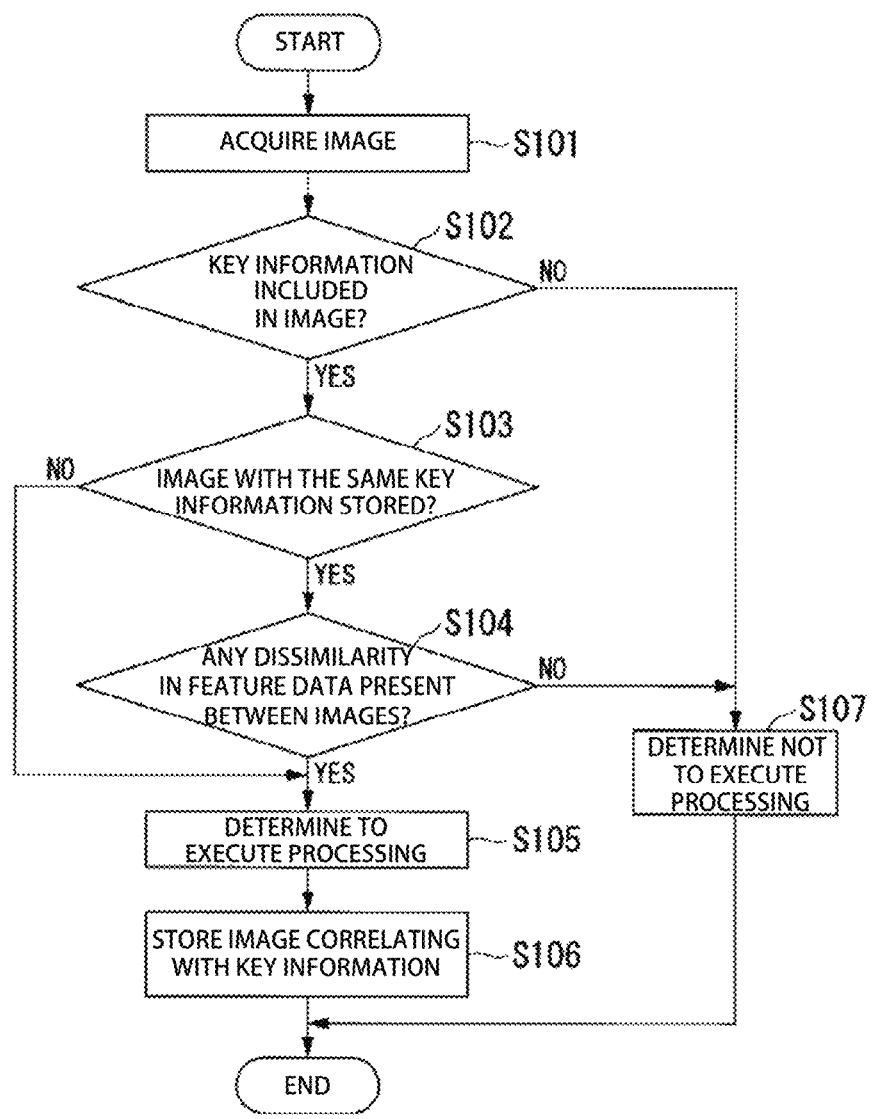
FIG. 8 is a flow diagram illustrating operations of the server computer 50, according to the first embodiment.

FIG. 8 is a flow diagram illustrating operations of the server computer 50 according to the first embodiment.

First, the server computer 50 allows the input interface 530 to acquire image data transmitted from the mobile device 30 (step S101).

Next, the server computer 50 allows the information determination circuit 531 to determine whether key information is included in the image data (step S102).

If key information is included in the image data (YES at step S102), the server computer 50 allows the processing determination circuit 532 to determine whether an image including key information, which is the same as the key information included in the image data, is stored in the processing history storage table 520 (step S103).

If an image including key information, which is the same as the key information included in the image data, is present (YES at step S103), the processing determination circuit 532 extracts feature data from the acquired image that has been received from the information determination circuit 531 and also extracts feature data from the stored image that has been stored in the processing history storage table 520, and determines whether there is similarity between the extracted feature data (step 104).

If it is determined that there is dissimilarity in feature data between the two images (YES at step S104), the processing determination circuit 532 determines to execute image-based processing (step S105). Then, the processing determination circuit 532 correlates the image with the key information and stores the correlated image in the processing history storage table 520 (step S106).

If it is determined, at step S104, that there is similarity in feature data between the two images (NO at step S104), the processing determination circuit 532 determines not to execute image-based processing (step S107).

If it is determined, at step S103, that there is no image stored including key information that is the same as the key information included in the image data (NO at step S103), the server computer 50 performs step S105. Specifically, the processing determination circuit 532 determines to execute image-based processing and stores the user information and the like in the processing history storage table 520.

If it is determined, at step S102, that key information is not included in the image data (NO at step S102), the server computer 50 determines not to execute image-based processing (step S107).

As described above, the authentication device 1 according to the first embodiment includes: an input interface 530 that acquires an image of a hologram label 10 that is affixed to an access object 20 and includes an image indicating key information; a processing history storage table 520 that correlates a stored image (first image) acquired by the input interface 530 with key information included in the stored image and stores the correlated image; an information determination circuit 531 that refers to the processing history storage table 520, based on key information included in an acquired image (second image) acquired by the input interface 530 after acquisition of the stored image, and determines whether there is a stored image including key information corresponding to the key information of the acquired image; and a processing determination circuit 532 that compares feature data of the acquired image that is not key information with feature data of a stored image that is not key information in response to the information determination circuit 531 determining the key information of the stored image as being present, and uses the results of the comparison as a basis for determining whether to execute processing based on the acquired image.

Thus, the authentication device 1 according to the first embodiment can allow the information determination circuit 531 to acquire key information included in an image and can allow the processing determination circuit 532 to refer to the processing history storage table 520, based on the key information to thereby confirm that the image is not a reused image. The image of the hologram label 10 depends on the imaging angle and the quantity of light of a light source at the time of imaging. Accordingly, there is only a very low probability that the images captured at different times are the same. Therefore, the image used in access control using the access object 20 is prevented from being used again in the access control.

In the authentication device 1 according to the first embodiment, the input interface 530 acquires an image that has been captured so as to include a predetermined pattern (e.g., the markers M shown in FIG. 2) and the hologram label 10 which are indicated on the access object 20, and the processing determination circuit 532 compares the relative positions of the predetermined pattern and the hologram label 10 in the acquired image (e.g., the distances L-1 and L-2 shown in FIG. 7) with the relative positions of the predetermined pattern and the hologram label 10 in the stored image and uses the results of the comparison as a basis for determining whether to execute processing based on the acquired image.

Thus, in the authentication device 1 according to the first embodiment, the processing determination circuit 532 can extract feature data by a simple method of calculating the distances L-1 and L-2 from the acquired image and the stored image and comparing the images in terms of the calculated distances.

In the authentication device 1 according to the first embodiment, the key information may be site information indicating the site where the access object 20 with the hologram label 10 is located. Thus, in the authentication device 1 according to the first embodiment, the information determination circuit 531 can acquire the site information included in image data and, according to the site information, the processing determination circuit 532 can determine the presence or absence of a stored image including the same site information.

Modification 1 of First Embodiment

Next, Modification 1 of the first embodiment will be described. An authentication device 1A of the present modification is different from the first embodiment in that an access object 20A includes a display (not shown). Furthermore, the authentication device 1A is different from the first embodiment in that a memory 52A of a server computer 50A includes an access object information memory (not shown) that stores information correlating sites where access objects 20 are located with one another.

The display included in an access object 20 is provided near a hologram label 10 to display the site information indicating the position of the display. The display can receive radio waves from a global positioning system (GPS) satellite and analyze the received radio waves to detect the position of the display.

The camera 32 of the mobile device 30 captures an image so as to include the site information presented on the display and the hologram label 10, according to the user's operation. The site information to be presented on the display may change with time. Thus, the presented image is prevented from being reused.

The input interface 530 of the server computer acquires an image including site information presented on the display and the hologram label 10, and the processing determination circuit 532 refers to the access object information memory based on the site information. If there is no match between the site information included in the image and the site where the access object 20 is located, the processing determination circuit 532 can determine not to execute processing based on the image.

Thus, the authentication device 1A according to Modification 1 of the first embodiment can determine not to authenticate the user's request if the access object 20, or, the hologram label 10 and the display cut out of the access object 20, have been carried away and an image captured at another site is acquired.

Modification 2 of First Embodiment

Next, Modification 2 of the first embodiment will be described. An authentication device 1B of the present modification is different from the first embodiment in that the mobile device 30 includes a GPS receiver (not shown) and transmits position information indicating the position of the mobile device 30 to the server computer 50.

In the present modification, when image data has been acquired from the mobile device 30, the input interface 530 of the server computer requests the mobile device 30 to provide position information of the mobile device 30 at the time of imaging. The input interface 530 outputs data requesting position information to the communication circuit 51, so that the request is transmitted to the mobile device 30 via the communication circuit.

When the request for position information has been received from the server computer 50, the mobile device 30 transmits data including corresponding position information to the server computer 50. The mobile device 30 derives position information based on radio waves transmitted from the satellite and received by the GPS receiver.

The input interface 530 of the server computer acquires position information of the mobile device 30. The input interface 530 outputs the acquired position information to the information determination circuit 531.

The information determination circuit 531 determines whether the site information presented by key information included in the image data corresponds to the position information of the mobile device 30 acquired by the input interface 530. If the distance between the position indicated by the site information and the position indicated by the position information is not more than a predetermined threshold, the information determination circuit 531 determines that the site information corresponds to the position information. This is because, by the time the mobile device 30 receives the request for position information from the server computer 50, the mobile device 30 may have moved from the imaging site. The information determination circuit 531 outputs the determination results to the processing determination circuit 532.

If the site information does not correspond to the position information, the processing determination circuit 532 uses the determination received from the information determination circuit 531 as a basis for determining not to perform image-based processing.

Thus, in Modification 2 of the first embodiment, the authentication device 1B can perform image-based processing if the processing determination circuit 532 determines that the site information corresponds to the position information. Accordingly, in Modification 2 of the first embodiment, if a stored image corresponding to the acquired image is not stored in the processing history storage table 520, but if the position indicated in the site information of the hologram label 10 is greatly distanced from the position of the mobile device 30 and the image is not assumed to be an image captured by the mobile device 30, the authentication device 1B can determine that the image is not an image captured by the user and determine not to authenticate the user's request.

Considering the case where the mobile device 30 may have moved from the imaging site by the time the mobile device 30 receives the request for position information from the server computer 50, the mobile device 30 in the present modification may be ensured to transmit an image to the server computer 50 within a predetermined time from when the image has been captured. Alternatively, when the image of the hologram label 10 is captured, a screen for confirming whether or not the stamp has been acquired may be displayed on the display 33 by the dedicated application of the mobile device 30.

Alternatively, when the image of the hologram label 10 has been captured by the mobile device 30, the position information may be acquired and the acquired position information may be correlated with the image and the correlated image may be stored in the memory 34.

Modification 3 of First Embodiment

Next, Modification 3 of the first embodiment will be described. An authentication device 1C of the present modification is different from the first embodiment in that the server computer 50 specifies imaging conditions for the mobile device 30.

Figures 9, 10:
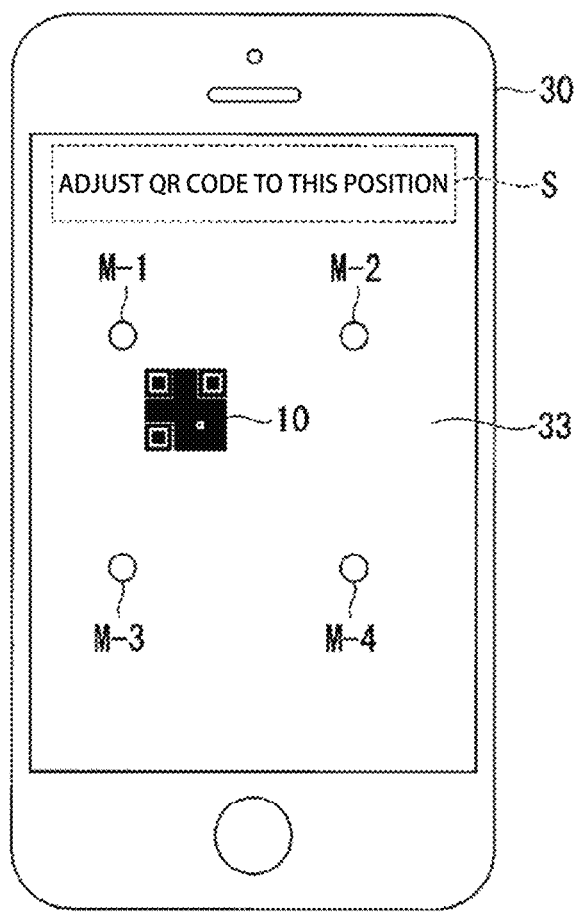
FIG. 9 is a diagram illustrating Modification 3 of the first embodiment.
FIG. 10 is a diagram illustrating a configuration of a processing history storage table 520D, according to a second embodiment.

FIG. 9 is a diagram illustrating Modification 3 of the first embodiment. FIG. 9 shows the display of the mobile device 30 presenting a follow-up imaging request received from the server computer 50.

As shown in FIG. 9, the server computer 50 transmits image data (termed guide data hereinafter) to the mobile device 30 to have the mobile device 30 display an image indicating a correlation between markers M and the hologram label 10 together with a text message S. The server computer 50 may transmit the guide data to the mobile device 30 when the mobile device 30 has entered a mode of capturing an image via a dedicated application.

The display 33 of the mobile device 30 presents the guide data received from the server computer 50 so as to be superimposed over the screen in the imaging mode. Thus, the user can move the mobile device 30 such that the markers M and the hologram label 10 overlap the guide displayed on the screen in the imaging mode and easily capture an image satisfying the imaging conditions specified by the server computer 50.

In the present modification, the processing determination circuit 532 may be ensured to determine to execute image-based processing when there is similarity between the feature data based on the imaging conditions notified by the server computer 50 to the mobile device 30, and the feature data of the acquired image. Thus, in Modification 3 of the first embodiment, the authentication device 1C can minimize or prevent reuse of images by specifying different imaging conditions for each imaging.

The first and second images are acquired at different times and are stored in the processing history storage table. An acquired image is determined as to authenticity by the information determination circuit, and the authenticity is finalized by the processing determination circuit. The time lag between acquisition of the first or second image and finalization of authenticity may be five seconds or less. More preferably, the time lag may be one second or less. Thus, the user's stress may be alleviated at the time of authentication.

Second Embodiment

Next, a second embodiment will be described. An authentication device 1D according to the present embodiment is different from the first embodiment in that the access object 20 is a rental article. In the present embodiment, the rental article is a bicycle, a book, or the like. The present embodiment is different from the first embodiment in that the processing history storage table 520 stores current status information. Specifically, in the present embodiment, privileges associated with the access object 20 are granted.

FIG. 10 is a diagram illustrating a configuration of a processing history storage table 520D according to the second embodiment. The processing history storage table 520D includes an item of current status information. As the current status information, information indicating the current status of the rental article to be requested by the user is stored. If the user requests rental of an article, "rented" is stored as current status information. The current status information may be rented, broken, partially broken, scratched, under repair, or the like.

In the present embodiment, the mobile device 30 transmits a processing request indicating processing requested by the user to the server computer 50, together with the image data and the like. The processing request may be data requesting rental of an article or return of a rental article.

Based on the key information included in the acquired image, the processing determination circuit 532 refers to the processing history storage table 520 of the corresponding access object 20 to acquire the current status information of the access object 20.

The processing determination circuit 532 determines whether there is a match between the acquired current status information and the processing request of the user provided together with the acquired image. If there is a match, the processing determination circuit 532 determines not to perform processing corresponding to the user's processing request.

Thus, if there is received a request from a user or the like for renting an article that has already been rented to another user, the authentication device 1D according to the second embodiment can perform an operation for not authenticating rental of the article. If a bicycle that has been rented to a user is parked at a parking lot and if another user captures an image of the hologram label 10 affixed to this bicycle and requests rental of the same, the authentication device 1D can determine not to authenticate the request for renting the bicycle because it is rented currently. In other words, the authentication device 1D determines not to grant a privilege associated with the access object 20.

Also, the processing determination circuit 532 determines whether there is a match between the acquired current status information and the processing request of the user provided together with the acquired image. If there is no match, the processing determination circuit 532 determines to perform processing corresponding to the user's processing request.

Thus, if a request for return of a rental article is received when the article has been rented, the authentication device 1D according to the second embodiment can authenticate the return of the rental article. Even if a request for return of a rental bicycle that has been rented by a user is made by another user, the authentication device 1D according to the second embodiment can authenticate the return request.

The embodiments set forth above have been described assuming the case where one server computer 50 includes functional units for achieving the functions of the authentication device 1 (e.g., the input interface 530, the information determination circuit 531, the processing determination circuit 532, the processing history storage table 520, and other functions). However, the present invention is not limited to this. An image of a hologram may be acquired by another computer or the like, and the acquired image may be used as a basis for the server computer 50 to determine whether to execute image-based processing.

Modification 4 of Embodiment

Figures 11A, 11B, 11C:
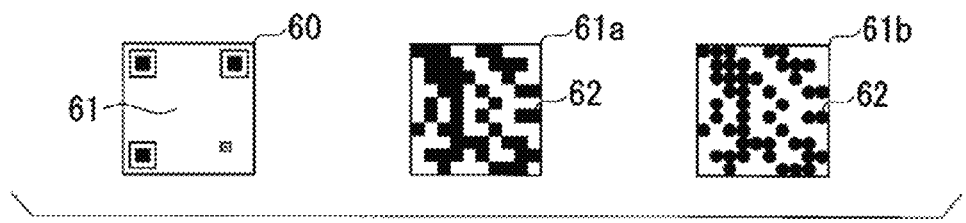
FIGS. 11A, 11B, and 11C are a set of diagrams illustrating a reconstructed hologram image, according to Modification 4 of an embodiment.
Figure 12:
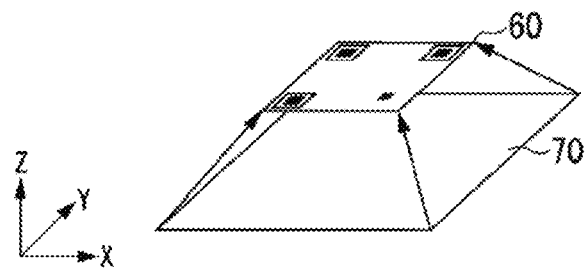
FIG. 12 is a perspective view illustrating a hologram that produces a reconstructed hologram image, according to Modification 4 of an embodiment.

FIGS. 11A, 11B, and 11C are a set of diagrams illustrating a reconstructed hologram image, according to Modification 4 of an embodiment. FIG. 12 is a perspective view illustrating a hologram that produces a reconstructed hologram image, according to Modification 4 of an embodiment.

In particular, FIG. 11A is a diagram illustrating a reconstructed hologram image 60, and FIGS. 11B and 11C are diagrams illustrating reconstructed hologram image bit element groups 61 (61a, 61b) included in the reconstructed hologram image 60 of FIG. 11A. The reconstructed hologram image bit element groups 61b and 61c respectively shown in FIGS. 11B and 11C may each have a single reconstructed hologram image bit element 62 (this element may be simply termed bit element 62 hereinafter).

Instead of the hologram label 10 described above, the reconstructed hologram image 60 can be applied to the present invention.

The bit elements 62 forming a two-dimensional code (such as QR code) of the reconstructed hologram image 60 may each have a shape that is not limited to a square but may be a circle, triangle or polygon. The shape of each of the bit elements 62 is not particularly limited as long as they are identifiable as a two-dimensional code.

The two-dimensional code of the reconstructed hologram image 60 is reconstructed as a hologram label at a specific position in a space. The bit elements 62 are reconstructed at respective reconstruction points in a space, i.e., at positions corresponding to the bits of the reconstructed hologram image 60. These bit elements 62 assembled to the reconstructed hologram image 60 can form a two-dimensional code as shown in FIGS. 11A, 11B, and 11C.

The reconstruction points are reconstructed at positions apart from the surface where the hologram label is located. In other words, the reconstruction points are reconstructed in a three-dimensional space. Specifically, as shown in FIG. 12, the reconstructed hologram image 60 is reconstructed at a level of $Z \neq 0$, where the plane in which a hologram 70 is located is an XY plane, the direction normal to the XY plane is a Z direction and the level of the surface where the hologram 70 is located is $Z=0$. The distance of the reconstruction points from the surface where the hologram label is located may be in the range of 1 mm or more and 5 cm or less.

Modification 5 of Embodiment

Figure 13:
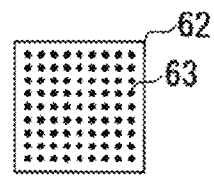
FIG. 13 is a diagram illustrating an assemblage of reconstruction point illuminants, according to Modification 5 of an embodiment.

FIG. 13 is a diagram illustrating an assemblage of reconstruction point illuminants, according to Modification 5 of an embodiment. In the present invention, instead of the configuration of Modification 4, bit elements 62 may be formed by a collection of reconstruction point illuminants 63 which are reconstructed from a hologram.

If a reconstructed hologram image is reconstructed by the assemblage of the bit elements 62 at the reconstruction points, the bit elements 62 become bright because they are formed by assemblage of the reconstruction point illuminants 63. That is, the bright regions correspond to white regions in a two-dimensional code.

The bit elements 62 may be formed by image elements other than reconstructed hologram image elements. In this case, since the bit elements 62 do not contain reconstruction points reconstructed by a hologram structure, the bit elements 62 correspond to black regions in a two-dimensional code.

The bit elements 62 may be formed by uniform single-reconstructed-image elements as a reconstructed hologram image. Alternatively, the bit elements 62 may be formed by a collection of a plurality of reconstruction point illuminants 63 of the hologram.

If the hologram is formed of a computer hologram, positive first-order light of the reconstructed hologram image may have higher intensity than negative first-order light thereof. Since this may reduce components of diffraction light (such as negative first-order light, or positive or negative second-order light) as noise, the reconstructed hologram image of positive first-order light may be made brighter. The negative first-order light as noise may be reconstructed. This may improve detection ratio of reading the reconstructed hologram image.

Such a hologram can be achieved by a relief hologram having a blazed structure. A hologram having a blazed structure records phase differences of the hologram as relief depths at points of the recording surface of the hologram. This is also called a kinoform.

Modification 6 of Embodiment

If a plurality of images are transmitted from a plurality of user terminal devices to the server device when acquiring a first image (reconstructed hologram image) and a second image (reconstructed hologram image), or when acquiring a second image in particular, the imaging positions and angles may be specified in the sequence of image acquisition.

This may reduce errors that would be caused by transmitting images captured at the same angle to the server device. Also, the images captured in advance may be prevented from being reused. This sequential specification of images may avoid the case where the images captured at different angles and different positions are uploaded to weblogs or the like and used for determining counterfeiting.

When captured images have been determined to be identical, the process may return to the image acquisition sequence again to prompt for image acquisition at different positions and angles. The sequential specification of images is considered to reduce errors when there are a large number of people capturing an image.

Modification 7 of Embodiment

Figure 14A:
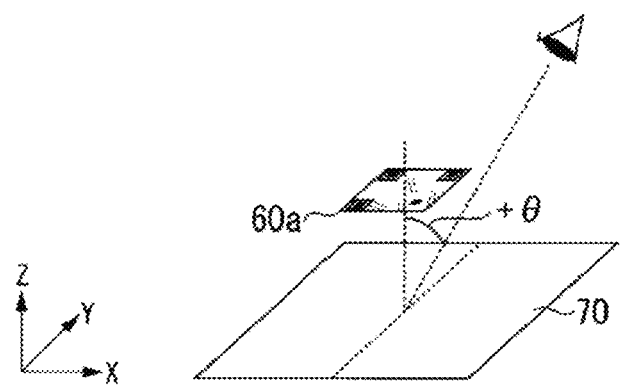
FIG. 14A is a perspective view illustrating a hologram that reconstructs two reconstructed images at different viewing angles, according to Modification 7 of an embodiment.
Figure 14B:
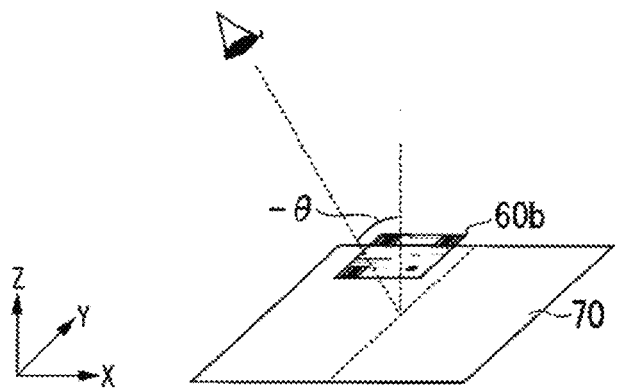
FIG. 14B is a perspective view illustrating a hologram that reconstructs two reconstructed images at different in viewing angles, according to Modification 7, according to an embodiment.

FIGS. 14A and 14B are perspective views illustrating a hologram that reconstructs two reconstructed images at different viewing angles, according to Modification 7 of an embodiment. FIG. 14A shows the case of observing a reconstructed hologram image in a direction +θ relative to the normal direction of a hologram 70. FIG. 14B shows the case of observing a reconstructed hologram image in a direction −θ relative to the normal direction of the hologram 70. Reconstructed hologram images 60*a* and 60*b* respectively shown in FIGS. 14A and 14B can form two-dimensional codes different from each other. In addition, the reconstruction positions of the reconstructed hologram images 60*a* and 60*b* as seen in the normal direction (Z direction) may be different from each other.

Figure 15A:
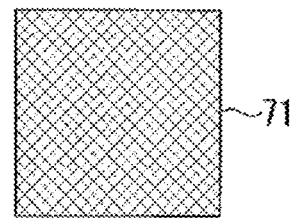
FIG. 15A is a plan view illustrating a calculated hologram structure, according to Modification 7 of an embodiment.
Figure 15B:
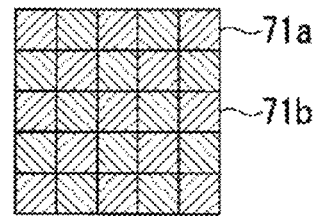
FIG. 15B is a plan view illustrating a calculated hologram structure, according to Modification 7 of an embodiment.

FIGS. 15A and 15B are plan views each illustrating a calculated hologram structure, according to Modification 7 of an embodiment.

In Modification 7, reconstructed hologram images depend on reconstruction directions. As described above, a reconstructed hologram image is reconstructed in a three-dimensional space. A reconstructed hologram image can be viewed within a viewing angle enabling observation of the reconstructed hologram image.

Modification 7 has a basic configuration in which a reconstructed hologram image is formed in a space. This basic configuration can prevent extraction of feature points from a video while it is recorded, estimation of three-dimensional information from variations of the feature points, and imitation of reconstruction points of the hologram. Using a reconstructed hologram image, a three-dimensional reconstructed image may be imitated.

In this regard, as shown in FIGS. 14A to 15B, a reconstructed hologram image may have a hologram structure which reconstructs different reconstructed images depending on the reconstructing direction within a viewing angle enabling observation of the reconstructed hologram image.

This hologram structure may prevent reformulation, counterfeiting, and imitation of three-dimensional information from a plurality of captured images.

FIGS. 14A and 14B show the case where different reconstructed hologram images are formed in two directions. Alternatively, however, a reconstructed hologram image may be produced being divided in two or more directions. The hologram structure for reconstructing a reconstructed hologram image in two or more directions can be obtained by specifying the viewing angles of the reconstructed hologram image and calculating a computer hologram. As shown in FIG. 15A, the calculated hologram structure may be formed on one plane 71. Alternatively, as shown in FIG. 15B, a plurality of hologram structures for producing reconstructed images in several directions may be calculated, and the hologram structures as a plurality of cell structures, such as 71*a* and 71*b*, that depend on the reconstruction directions may form an assemblage.

FIGS. 14A and 14B show the case where different two-dimensional codes are used as reconstructed hologram images. Alternatively, however, a fixed two-dimensional code may be used and only the position of the normal direction (Z direction) in which the two-dimensional code is reconstructed may be changed.

FIGS. 14A and 14B show the case where different two-dimensional codes are used as reconstructed hologram images. Alternatively, however, a fixed two-dimensional code may be used and dummy codes or decorative holograms may be additionally provided around or in the two-dimensional code. The positions or reconstruction motifs of the additionally provided reconstructed hologram image point illuminants may be different between directions +θ and −θ. Alternatively, reconstructed image point illuminants other than these may be used as markers. The markers can be used for calculating observation angles. Thus, imitating the three-dimensional reconstructed image may be made even more difficult.

The reconstruction angle θ may be in the range of 0 to 60 degrees. The reconstruction angle is preferred to be in the range of 0 to 45 degrees. With this range, the structure of the hologram may be prevented from becoming excessively complicated. The reconstruction angle is even more preferred to be in the range of 0 to 20 degrees. With this range, a hologram having high brightness may be obtained. The reconstruction angle is most preferred to be in the range of 10 to 20 degrees. With this range, a hologram structure near regular reflection that does not contribute to reading may be excluded and thus noise may be reduced. When calculating a computer hologram structure, reconstruction angle information may be specified so that a reconstruction angle of the hologram can be designed.

Modification 8 of Embodiment

When using the authentication device described above, it is desirable that the user of the user terminal matches the account of the terminal. In this regard, by providing a login processing sequence when using the authentication device, the user of the user terminal and the photographer information can be verified. Otherwise, the account of the user can be verified in the terminal or the server device. Through this verification, legitimacy of the user account can be verified.

Verification of the user terminal and the user information may be performed by the user terminal. Biometric authentication may be applied to verification of the user terminal and the user or photographer information. For verifying the user or photographer information, biometric authentication may be desirably performed through a user terminal having a function such as of user face or fingerprint authentication.

Modification 9 of Embodiment (Medium)

Figure 16A:
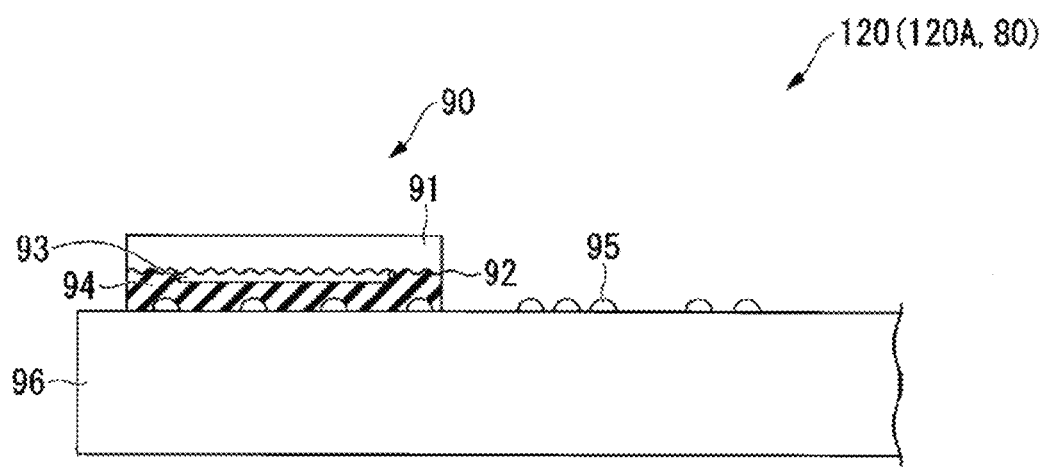
FIG. 16A is a cross-sectional view illustrating an access object (display object or medium), according to Modification 9 of an embodiment.
Figure 16B:
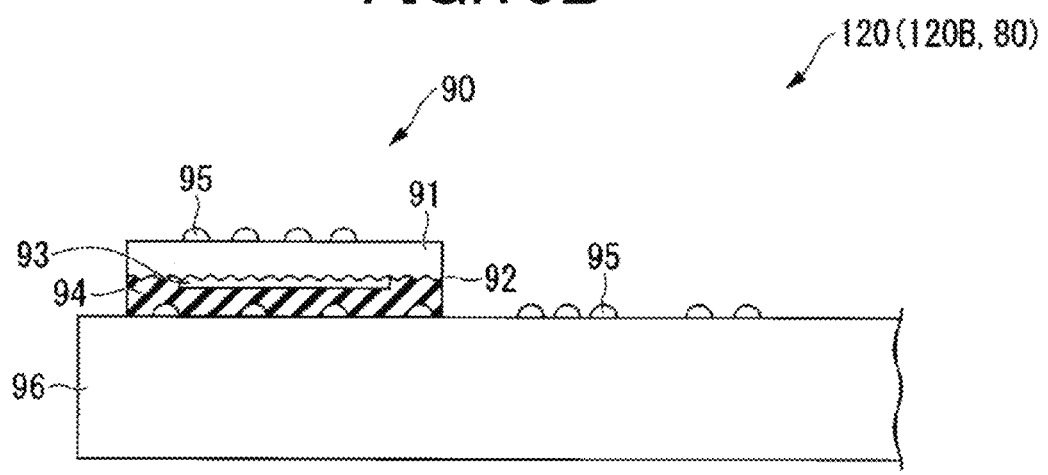
FIG. 16B is a cross-sectional view illustrating an access object (display object or medium), according to Modification 9 of an embodiment.

FIGS. 16A and 16B are cross-sectional views illustrating an access object 120 (120A, 120B, display object 80 or medium).

The access object 120 includes a plate 96 (base material), a printed part 95 which is provided on the plate 96, and a hologram laminate 90 which is affixed overlapping the printed part 95.

The plate 96 may be printed matter. The printed matter includes the printed part 95. The printed matter may be signage. The signage may be an advertisement. The advertisement may be a poster, sign board or POP advertisement. Alternatively, the plate may be a package. The material for the plate 96 may be paper, a plastic film, a metal plate, or a wood plate.

The printed part 95 may be formed by printing visible printing ink. The ink may be visible or invisible ink. The visible ink may be color ink or optically variable ink.

The color ink may be translucent ink or opaque ink. The ink may be gravure ink, offset ink, inkjet ink, or flexo ink. Inkjet ink, which can be printed by ink jetting, is suitable for printing a specific piece of information. Opaque ink can conceal base printing and improve readability. The color ink represents an object color. The object color presents a constant color without depending on the observation angle or illumination angle. Thus, the opaque ink has high readability.

The optically variable ink may be pearl ink, magnetic ink or the like. The optically variable ink presents color variation depending on the observation angle or the illumination angle and thus has high anti-counterfeiting properties.

The invisible ink may be fluorescent ink, infrared absorbing ink or the like. These types of ink are not visible to the naked eye. An image produced by these types of ink can be observed by using a special light source or a special camera. Therefore, the presence of such invisible ink is less likely to be noted by counterfeiters.

The hologram laminate 90 may be a laminate in which an adhesive layer 94, a deposition layer 93 and a hologram layer 91 are laminated upward in this order on a surface of the plate 96. The hologram layer 91 may be a volume hologram having refractive index difference therein or may be a relief hologram having asperities on a surface thereof.

The hologram layer 91 may be an embossed layer on which asperities are formed. The asperities of the embossed layer may be formed by hot-pressing a stamper. The asperities are formed on a surface of the embossed layer.

The surface of the embossed layer on which asperities are formed may be an embossed surface.

An embossed surface 92 can reconstruct a reconstructed hologram image. The reconstructed hologram image can be reconstructed by diffracted light or the like from the embossed surface 92. A light-reflecting deposition layer may be formed on the embossed surface. The deposition layer may cover the entire or part of the embossed surface. The deposition layer may be formed by deposition. The deposition may be physical deposition or chemical deposition. The physical deposition may be vacuum deposition, sputtering or the like. The chemical deposition may be CVD. The deposition layer may be made of metal, silicon oxide, or a metal compound. The metal may be pure metal or an alloy. The pure metal may be aluminum, silver, nickel, titanium or the like. The alloy may be an alloy of these metals. The metal compound may be a metal oxide, metal fluoride or metal sulfide. The metal oxide may be titanium oxide or aluminum oxide. The metal fluoride may be magnesium fluoride, calcium fluoride or the like. The metal sulfide may be zinc sulfide or the like. The deposition layer covering part of the embossed surface may be formed by etching away part of the deposition layer.

The hologram laminate 90 may be affixed to the plate 96 via the adhesive layer 94. The adhesive layer 94 may be made of an acrylic adhesive, a polyester adhesive, a urethane adhesive or the like.

Furthermore, adhesion strength between the adhesive layer 94 and the hologram layer 91 or the deposition layer 93 may be partially reduced. Adhesion strength between the adhesive layer and the hologram layer 91 or the deposition layer 93 can be partially reduced by partially forming a release layer therebetween. The adhesive layer with adhesion strength partially reduced is a brittle adhesive layer. When the hologram laminate 90 is attempted to be separated from the access object 20, only the portion with reduced adhesion strength is separated due to the brittle adhesive layer, and the remaining portion is left on the access object 20. Therefore, the hologram laminate 90 is broken. For this reason, the hologram laminate 90 may be prevented from being separated and reused. Thus, falsification of re-affixing the hologram laminate 90 can be prevented.

This may secure information correlation between the access object 20 and the hologram laminate 90.

As shown in FIG. 16B, the printed part 95 may be newly provided on the hologram layer 91 after affixing the hologram laminate 90 to the plate 96. Since the printed part 95 is provided after affixing the hologram laminate 90 to the plate 96, separation of the hologram laminate 90 may be more difficult. In addition, if the printed part 95 formed on the hologram laminate 90 form a continuous pattern together with the printed part 95 formed on the plate 96, separation of the hologram laminate 90 may be even more difficult.

Thus, by increasing difficulty of separating the hologram laminate 90, counterfeiting or imitation by separating the hologram laminate 90 and affixing the separated hologram laminate 90 to another base material can be prevented.

The material for the deposition layer 93 of the hologram laminate 90 may be a metal material.

The metal material may be aluminum, gold, silver, copper, platinum, nickel or chromium. The deposition layer 93 made of such a metal material may improve reflectance of the embossed surface 92. Therefore, the reconstructed hologram image is ensured to have higher brightness. Consequently, the reconstructed hologram image may be more easily recognized in the authentication device.

FIGS. 16A and 16B show the case where the deposition layer 93 is partially formed on the embossed surface 92. With this configuration, since the deposition layer 93 (reflection layer) can be prevented from being chemically treated and broken, counterfeiting or imitation is made more difficult. The deposition layer 93 may be used for expressing a pattern.

In practice, the deposition layer 93 may be formed on the front of the embossed surface 92.

The material for the deposition layer 93 may be a metal material as mentioned above but may be a dielectric material which is transparent in the visible light wavelength range. The dielectric material may be a metal oxide or a metal sulfide. The metal oxide may, for example, be silicon dioxide ($SiO_2$), titanium dioxide ($TiO_2$), zirconium oxide ($ZrO_2$), aluminum oxide ($Al_2O_3$) or tantalum oxide ($Ta_2O_5$). The metal sulfide may be zinc sulfide (ZnS) or the like. The material forming the embossed surface 92 may have a refractive index different from that of the deposition layer 93. If the refractive indices are different from each other, reflectance at the interface may be improved. Accordingly, the reconstructed hologram image formed by the embossed surface 92 may increase brightness. Consequently, the reconstructed hologram image may be easily recognized in the authentication device.

Modification 10 of Embodiment

Figure 17A:
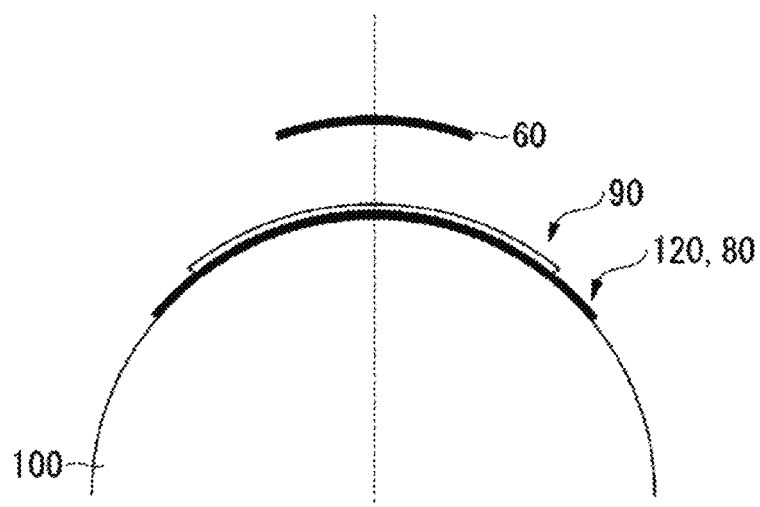
FIG. 17A is a cross-sectional view illustrating a hologram laminate in the case where an object on which a display object is located has a curved surface, according to Modification 10 of an embodiment.

FIGS. 17A to 17D show the case where an object 100 on which a display object 80 is located has a curved surface. With the hologram laminate 90 explained referring to FIG. 17A, a flat two-dimensional code as shown in FIGS. 12, 14A, 14B, 15A and 15B is obtained as a reconstructed hologram image. If the object 100 has a curved surface, the surface of the two-dimensional code obtained as a reconstructed hologram image is distorted, as shown in FIG. 17A, in conformity with the curved surface of the object 100.

Figure 17B:
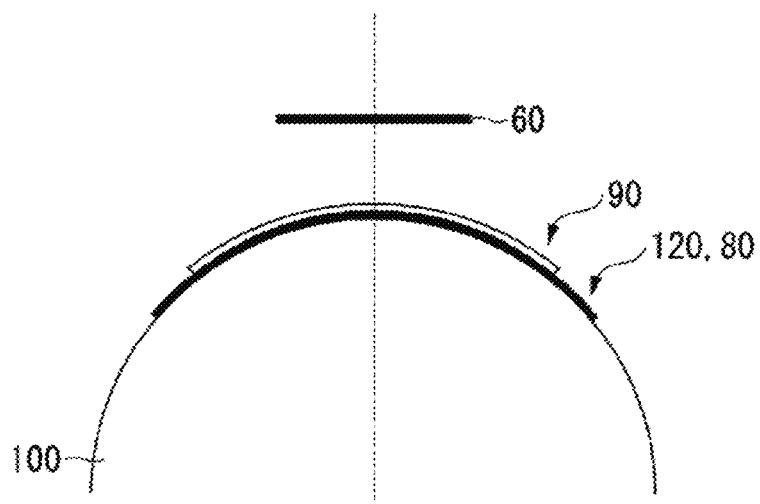
FIG. 17B is a cross-sectional view illustrating a hologram laminate in the case where an object on which a display object is located has a curved surface, according to Modification 10 of an embodiment.

However, if the curvature radius of the curved surface of the object 100 is known in advance at the time of recording the hologram or calculating the hologram structure, the reconstructed hologram image can be made flat, as shown in FIG. 17B, even when the hologram laminate 90 is affixed to the curved surface of the object 100.

Figure 17C:
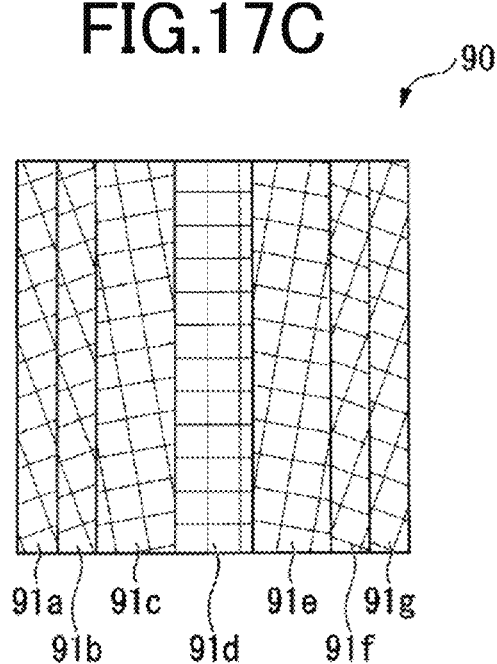
FIG. 17C is a diagram illustrating a structure of a hologram laminate which is divided into a plurality of narrow rectangular segments in the case where an object on which the display object is located has a curved surface, according to Modification 10 of an embodiment.
Figure 17D:
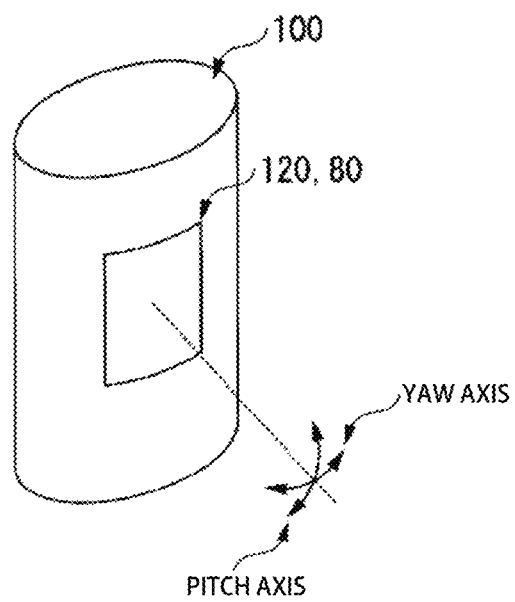
FIG. 17D is a diagram illustrating a correlation between a hologram laminate which is divided into a plurality of narrow rectangular segments, and angular change in a yaw axis direction in the case where an object on which the display object is located has a curved surface, according to Modification 10 of an embodiment.

As shown in FIG. 17B, a flat reconstructed hologram image can also be obtained with the object 100 having a curved surface. The flat reconstructed hologram image can be obtained by using a method of arranging a hologram structure as shown in FIG. 17C. As shown in FIG. 17A, a reconstructed hologram image 60 is distorted in conformity with the curved surface because the angle of incidence of light on the hologram laminate 90 varies due to the curved surface.

When the curvature of the curved surface is known in advance, the angle of incidence of light can be estimated. Thus, a flat reconstructed hologram image 60 can be obtained by dividing the hologram laminate 90 into narrow rectangular segments, as shown in FIG. 17C, and arranging these segments of the hologram laminate 90 having different angles of incidence in these regions 91a, 91b, 91c, 91d, 91e, 91f, and 91g.

As shown in FIG. 17C, the hologram laminate 90 is formed with the segments thereof being respectively provided to the plurality of narrow rectangular divided regions 91. The plurality of narrow rectangular divided regions 91 correspond to angular changes in the yaw axis direction shown in FIG. 17D. The actual observation angle may also change in the pitch axis direction shown in FIG. 17D, and thus the regions 91 are desirably provided in a cell structure arrangement.

Modification 11 of Embodiment

Figure 18:
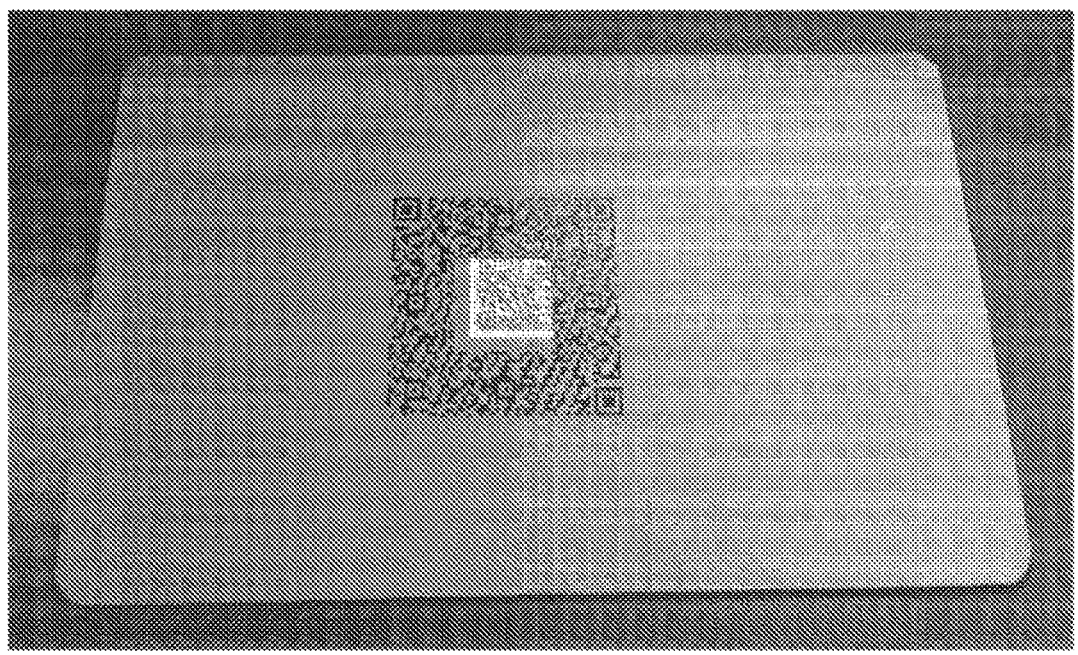
FIG. 18 is an image showing a QR code, as printed matter, provided around a hologram, according to Modification 11 of an embodiment.

FIG. 18 is an image showing a QR code, as printed matter, provided around a hologram, according to Modification 11 of an embodiment. The image in FIG. 18 has been obtained by using a camera-equipped smartphone (mobile device).

All or part of the authentication device 1 described in the foregoing embodiments may be achieved by a computer. In that case, the authentication device 1 may be achieved by recording programs for realizing the functions on a computer-readable recording medium and allowing a computer system to read and execute the programs recorded on the recording medium. The computer system referred to herein includes an operating system (OS) and hardware such as peripheral devices. The computer-readable recording medium refers to a storage device, including a portable medium such as a flexible disk, magnetooptical disk, ROM or CD-ROM, or a hard disk incorporated in a computer system. Furthermore, the computer-readable recording medium may include a medium that dynamically retains a program for a short period of time, like a communication line that transmits a program through a network, such as the Internet, or through a telecommunication line, such as a telephone line, or may include a medium that retains a program for some period of time, like a volatile memory in a computer system that serves as a server or a client. The above programs may achieve part of the functions described above, or may achieve functions in combination with programs already recorded in a computer system, or may achieve functions by using a programmable logic device, such as an FPGA. The circuits described above may be configured by at least one integrated circuit. The integrated circuit may include a memory integrated with programs. The integrated circuit may further include components, such as a resistor, a capacitor and the like. Furthermore, the integrated circuit may include a coil.

REFERENCE SIGNS LIST

1 . . . Authentication device; 10 . . . Hologram label; 20 . . . Access object; 30 . . . Mobile device; 40 . . . Communication network; 50 . . . Server computer; 520 . . . Processing history storage table; 530 . . . Input interface; 531 . . . Information determination circuit; 532 . . . Processing determination circuit

What is claimed is:

1. An authentication device, comprising:
an input interface that acquires a plurality of images of a hologram label that is affixed to an access object and each image of said plurality of acquired images includes an image indicating key information;
a processing history storage table that correlates a first image of the plurality of acquired images with key information included in the first image and stores the correlated image;
an information determination circuit that refers to the processing history storage table, based on key information included in a second image of the plurality of the acquired images, the second image being acquired by the input interface after acquisition of the first image, and determines whether the key information of the first image exists that corresponds to the key information of the second image; and, a processing determination circuit that compares feature data of the second image that is not the key information of the second image with feature data of the first image that is not the key information of the first image in response to the information determination circuit determining the key information of the first image as being present, and uses the results of the comparison as a basis for determining whether to execute processing using the second image.

2. The authentication device of claim 1, wherein:

each image of the plurality of the acquired images includes a predetermined pattern and the hologram label, the predetermined pattern being provided to the access object; and, the processing determination circuit determines whether to execute the processing using the second image, based on the results of comparing relative positions of the predetermined pattern and the hologram label in the second image, with relative positions of the predetermined pattern and the hologram label in the first image.

3. The authentication device of claim 1, wherein the key information in each image of the plurality of acquired images is site information indicating a site where the access object with the hologram label is located.

4. The authentication device of claim 1, wherein:

the device further comprises a display to receive and present thereon information indicating a position of the hologram label;

each image of the plurality of acquired images includes site information and the hologram label, the site information being shown on the display; and, in response to a site information of an acquired image of the plurality of acquired images that does not match predetermined site information, the processing determination circuit determines not to execute processing using the acquired image.

5. The authentication device of claim 1, wherein:

when acquiring an Xth image of the plurality of acquired images, the input interface acquires position information indicating the position of a terminal device from the terminal device which is a transmission source of the Xth image;

the information determination circuit determines whether site information indicated by key information of the hologram label corresponds to the position information acquired by the input interface; and, in response to the site information being determined not to correspond to the position information, the processing determination circuit determines not to execute processing using the Xth image.

6. The authentication device of claim 1, wherein:

the processing history storage table correlates current status information, which indicates processing performed based on the first image, with the first image; and, in response to the second image having been received, the processing determination circuit determines to execute processing using the second image when a processing request transmitted from a terminal device as a transmission source of the second image does not match a processing content indicated by the current status information of the first image.

7. The authentication device of claim 1, wherein:

the processing history storage table correlates current status information, which indicates processing performed based on the first image, with the first image; and, in response to the second image having been received, the processing determination circuit determines not to execute processing using the second image when a processing request transmitted from a terminal device as a transmission source of the second image matches a processing content indicated by the current status information of the first image.

8. An authentication method performed by an authentication device that includes a processing history storage table, comprising the steps of:

an acquisition step of acquiring a plurality of images of a hologram label that is affixed to an access object and each image of said plurality of acquired images includes an image indicating key information;

a storage step of correlating a first image of said plurality of acquired images with key information included in the first image and storing the correlated image in the processing history storage table;

an information determination step, performed by an information determination circuit, of referring to the processing history storage table, based on key information included in a second image of said plurality of acquired images, the second image being acquired by the input interface after acquisition of the first image, and determining whether the key information of the first image exists that corresponds to the key information of the second image; and, a processing determination step, performed by a processing determination circuit, of comparing feature data of the second image that is not the key information of the second image with feature data of the first image that is not the key information of the first image in response to the information determination circuit determining the key information of the first image as being present, and using the results of the comparison as a basis for determining whether to execute processing using the second image.

9. A server computer, comprising:

an input interface that acquires a plurality of images of a hologram label that is affixed to an access object and each image of said plurality of acquired images includes an image indicating key information;

a processing history storage table that correlates a first image of said plurality of acquired images with key information included in the first image and stores the correlated image;

an information determination circuit that refers to the processing history storage table, based on key information included in a second image of said plurality of acquired images, the second image being acquired by the input interface after acquisition of the first image, and determines whether the key information of the first image exists that corresponds to the key information of the second image; and, a processing determination circuit that compares feature data of the second image that is not the key information of the second image with feature data of the first image that is not the key information of the first image in response to the information determination circuit determining the key information of the first image as being present, and uses the results of the comparison as a basis for determining whether to execute processing using the second image.

10. The server computer of claim 9, wherein:

each image of the plurality of the acquired images includes a predetermined pattern and the hologram label, the predetermined pattern being provided to the access object; and, the processing determination circuit determines whether to execute the processing using the second image, based on the results of comparing relative positions of the predetermined pattern and the hologram label in the second image, with relative positions of the predetermined pattern and the hologram label in the first image.

11. The server computer of claim 9, wherein the key information of each image of the plurality of the acquired images is site information indicating a site where the access object with the hologram label is located.

12. The server computer of claim 9, wherein:

each image of the plurality of acquired images includes site information and the hologram label, the site information indicating a position of the hologram label and presented on a display to receive and present the site information thereon; and, in response to a site information included in an acquired image of the plurality of acquired images that does not match predetermined site information, the processing determination circuit determines not to execute processing using the acquired image.

13. The server computer of claim 9, wherein:

when acquiring an Xth image of the plurality of acquired images, the input interface acquires position information indicating the position of a terminal device from the terminal device which is a transmission source of the Xth image;

the information determination circuit determines whether site information indicated by key information of the hologram label corresponds to the position information acquired by the input interface; and, in response to the site information being determined not to correspond to the position information, the processing determination circuit determines not to execute processing using the Xth image.

14. The server computer of claim 9, wherein:

the processing history storage table correlates current status information, which indicates processing performed based on the first image, with the first image; and, in response to the second image having been received, the processing determination circuit determines to execute processing using the second image when a processing request transmitted from a terminal device as a transmission source of the second image does not match a processing content indicated by the current status information of the first image.

15. The server computer of claim 9, wherein:

the processing history storage table correlates current status information, which indicates processing performed based on the first image, with the first image; and, in response to the second image having been received, the processing determination circuit determines not to execute processing using the second image when a processing request transmitted from a terminal device as a transmission source of the second image matches a processing content indicated by the current status information of the first image.

16. An authentication method performed by a server computer that includes a processing history storage table, comprising the steps of:

an acquisition step, performed by an input interface, of acquiring an image of a hologram label that is affixed to an access object and includes an image indicating key information;

a storage step of correlating a first image acquired by the input interface with key information included in the first image and storing the correlated image in the processing history storage table;

an information determination step, performed by an information determination circuit, of referring to the processing history storage table, based on key information included in a second image, the second image being acquired by the input interface after acquisition of the first image, and determining whether key information of the first image exists that corresponds to key information of the second image; and, a processing determination step, performed by a processing determination circuit, of comparing feature data of the second image that is not key information with feature data of the first image that is not key information in response to the information determination circuit determining the key information of the first image as being present, and using the results of the comparison as a basis for determining whether to execute processing using the second image.

* * * * *